US011815651B2

(12) United States Patent
Mishchenko et al.

(10) Patent No.: US 11,815,651 B2
(45) Date of Patent: Nov. 14, 2023

(54) GEOLOGIC MODEL AND PROPERTY VISUALIZATION SYSTEM

(71) Applicant: Schlumberger Technology Corporation, Sugar Land, TX (US)

(72) Inventors: Oleg Mishchenko, Houston, TX (US); Alain Cudennec, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 17/595,398

(22) PCT Filed: May 21, 2020

(86) PCT No.: PCT/US2020/033913
§ 371 (c)(1),
(2) Date: Nov. 16, 2021

(87) PCT Pub. No.: WO2020/237001
PCT Pub. Date: Nov. 26, 2020

(65) Prior Publication Data
US 2022/0187496 A1 Jun. 16, 2022

Related U.S. Application Data

(60) Provisional application No. 62/850,558, filed on May 21, 2019.

(51) Int. Cl.
*G06T 17/10* (2006.01)
*G01V 99/00* (2009.01)
(Continued)

(52) U.S. Cl.
CPC ............ *G01V 99/005* (2013.01); *G01V 1/302* (2013.01); *G06T 3/40* (2013.01); *G06T 17/005* (2013.01);
(Continued)

(58) Field of Classification Search
None
See application file for complete search history.

(56) References Cited

U.S. PATENT DOCUMENTS 9,164,969 B1 * 10/2015 Gumaste .................. G06F 30/30
9,865,085 B1 *  1/2018 Eng ........................ G06T 17/005
(Continued)

FOREIGN PATENT DOCUMENTS

| CN | 108460056 | * | 8/2018 | ............. G06F 17/30 |
| WO | 2016205265 A1 | | 12/2016 | |
| WO | 2017053273 A1 | | 3/2017 | |

OTHER PUBLICATIONS

Extended Search Report issued in European Patent Application No. 20809254.4 dated Dec. 23, 2022, 8 pages.
(Continued)

*Primary Examiner* — Andrew G Yang
(74) *Attorney, Agent, or Firm* — Jeffrey D. Frantz

(57) ABSTRACT

A method can include accessing volumetric data from a data store, where the volumetric data correspond to a region; generating structured shape information for the region using at least a portion of the volumetric data; and, in response to a command from a client device, transmitting to the client
(Continued)

device, via a network interface, a visualization data stream generated using at least a portion of the structured shape information.

20 Claims, 24 Drawing Sheets

(51) Int. Cl.
*G01V 1/30* (2006.01)
*G06T 3/40* (2006.01)
*G06T 17/00* (2006.01)
*G06T 17/20* (2006.01)
*G06T 19/20* (2011.01)

(52) U.S. Cl.
CPC .............. *G06T 17/10* (2013.01); *G06T 17/20* (2013.01); *G06T 19/20* (2013.01); *G01V 2210/64* (2013.01); *G06T 2200/24* (2013.01); *G06T 2210/36* (2013.01); *G06T 2219/2021* (2013.01)

(56) References Cited

U.S. PATENT DOCUMENTS

| | | |
|---|---|---|
| 2003/0052878 A1* | 3/2003 | Han ....................... G06T 17/005 345/420 |
| 2011/0175899 A1 | 7/2011 | Bittar et al. |
| 2013/0097170 A1 | 4/2013 | Flanagan |
| 2014/0379317 A1 | 12/2014 | Sanden et al. |
| 2015/0149139 A1 | 5/2015 | Chavez et al. |
| 2016/0104317 A1 | 4/2016 | Salman |
| 2016/0178800 A1 | 6/2016 | Ramsay |
| 2017/0286799 A1* | 10/2017 | Gujar ................... G06V 30/347 |
| 2018/0190008 A1 | 7/2018 | Wakefield et al. |
| 2019/0051054 A1* | 2/2019 | Jovanovic ............... G06T 17/00 |
| 2019/0197786 A1* | 6/2019 | Molyneaux ........... G06T 15/405 |
| 2020/0018870 A1* | 1/2020 | Howell .................... G01V 1/42 |
| 2020/0213426 A1* | 7/2020 | Sennersten ............. H04L 69/26 |

OTHER PUBLICATIONS

International Search Report and Written Opinion for the equivalent PCT/US2020/033913 dated Aug. 31, 2020.

* cited by examiner

GEOLOGIC MODEL AND PROPERTY VISUALIZATION SYSTEM

RELATED APPLICATIONS

This application claims priority to and the benefit of a U.S. Provisional Application having Ser. No. 62/850,558, filed 21 May 2019, which is incorporated by reference herein.

BACKGROUND

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include accessing volumetric data from a data store, where the volumetric data correspond to a region; generating structured shape information for the region using at least a portion of the volumetric data; and, in response to a command from a client device, transmitting to the client device, via a network interface, a visualization data stream generated using at least a portion of the structured shape information. A system can include a processor; memory operatively coupled to the processor; and processor-executable instructions stored in the memory to instruct the system to: access volumetric data from a data store, where the volumetric data correspond to a region; generate structured shape information for the region using at least a portion of the volumetric data; and, in response to a command from a client device, transmitting to the client device, via a network interface, a visualization data stream generated using at least a portion of the structured shape information. One or more computer-readable storage media can include computer-executable instructions executable to instruct a computing system to: access volumetric data from a data store, where the volumetric data correspond to a region; generate structured shape information for the region using at least a portion of the volumetric data; and, in response to a command from a client device, transmitting to the client device, via a network interface, a visualization data stream generated using at least a portion of the structured shape information. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
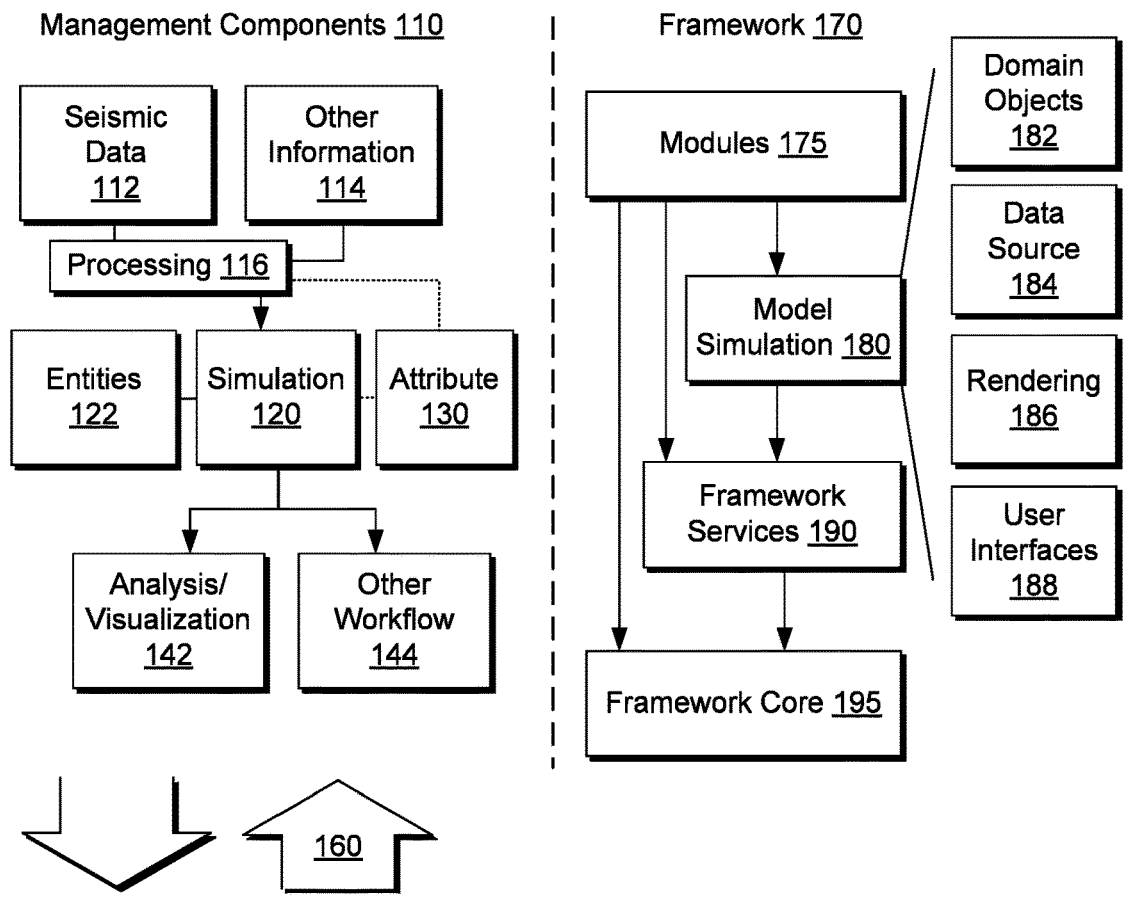
FIG. 1 illustrates an example system that includes various components for modeling a geologic environment and various equipment associated with the geologic environment.
Figure 1:
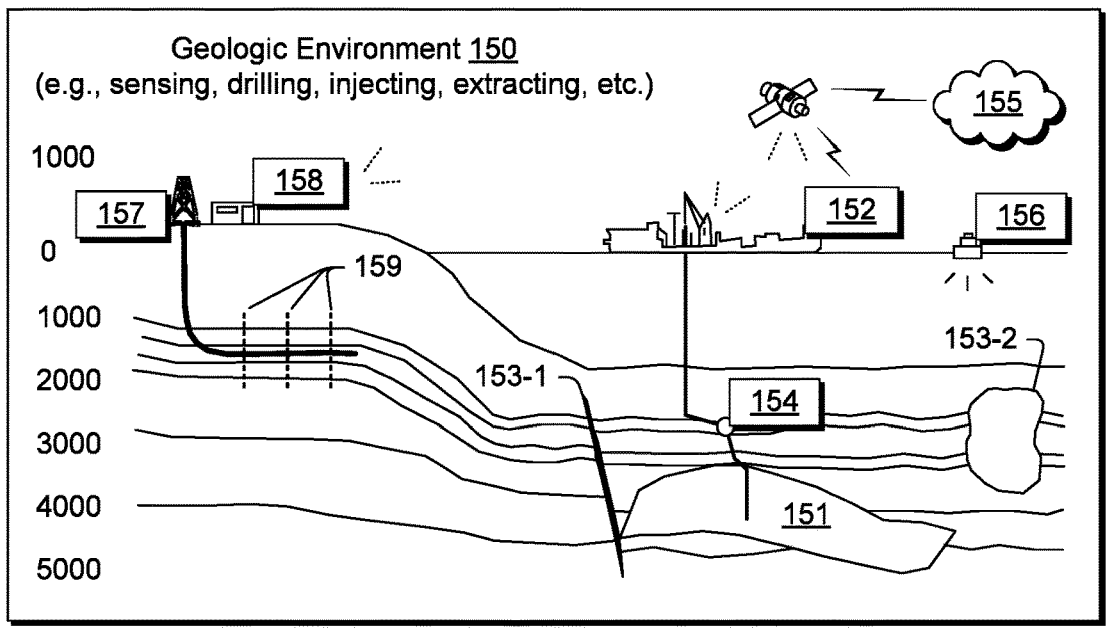

This description is not to be taken in a limiting sense, but rather is made merely for the purpose of describing the general principles of the implementations. The scope of the described implementations should be ascertained with reference to the issued claims.

Various field operations can be performed with respect to a geologic formation. Such operations can include exploration operations, development operations, production operations, etc., with respect to a reservoir in the geologic formation.

As an example, an operation can be a seismic survey that utilizes equipment to acquire a seismic data set as measured and recorded with reference to a particular area of the Earth, for example, to evaluate a subsurface formation. A seismic survey can be acquired using one or more of surface, ocean/sea bottom, marine, borehole, land or other technology. A seismic survey can acquire a seismic data set or sets, which can be spatial (e.g., 1D, 2D or 3D) or spatial and temporal (e.g., 1D, 2D or 3D in space and 1D in time). Seismic data can be visualized by processing and rendering to a display where an interpreter can identify and select boundaries that can are representative of structure(s) in the Earth (e.g. reflectors, etc.).

As an example, an "Earth model" (or earth model) may be constructed using interpreted seismic data and optionally one or more other types of data. For example, consider constructing an Earth model that represents a reservoir using seismic data and exploratory borehole data and performing a simulation of physical phenomena (e.g., fluid flow, etc.) using a reservoir simulator. Results of a simulator can indicate a possible target that may be reached by drilling a borehole into the formation where the borehole can be completed to form a well that can produce fluid from the reservoir.

As an example, an operation can be a drilling operation where a borehole can be drilled into a geologic formation where the bore may be utilized to form a well. As an example, an operation can be a logging operation, which may be a wireline logging operation, a logging while drilling operation or another type of logging operation. After a borehole is formed by drilling, a formation is exposed via the borehole, which provides an opportunity to utilize one or more logging tools to acquire measurements (e.g., via sensors) that can be processed to determine properties of the formation (e.g., rock properties, fluid properties, etc.). As an example, logging may be performed before, during or after casing, cementing, fracturing, treating, etc. As an example, a cased-hole logging tool may include equipment to measure fluid flow rates and/or one or more other production parameters in a wellbore or, for example, to examine integrity of a casing and/or cement.

A rig can be a system of components that can be operated to form a borehole in a geologic formation, to transport equipment into and out of a bore in a geologic formation, etc. As an example, a rig may include a system that can be used to drill a bore and to acquire information about a geologic formation, drilling, etc. As an example, a rig configured for drilling can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rotary steerable system (RSS) can be utilized to drill directionally. An RSS can include a bottom hole assembly (BHA) that includes features that provide for directional drilling. As an example, a rig or other surface equipment (e.g., onshore or offshore) may be utilized to perform one or more other types of operations, which can include logging operations.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Texas), the INTERSECT reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL seismic to simulation software framework (Schlumberger Limited, Houston, Texas). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN framework environment (Schlumberger Limited, Houston, Texas) allows for integration of add-ons (or plug-ins) into a PETREL framework workflow. The OCEAN framework environment leverages .NET tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN framework where the model simulation layer 180 is the PETREL model-centric software package that hosts OCEAN framework applications. In an example embodiment, the PETREL software may be considered a data-driven application. The PETREL software can include a framework for model building and visualization.

As an example, seismic data may be processed using a framework such as the OMEGA framework (Schlumberger Limited, Houston, TX). The OMEGA framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA framework.

A framework for processing data may include features for 2D line and 3D seismic surveys. Modules for processing seismic data may include features for prestack seismic interpretation (PSI), optionally pluggable into a framework such as the OCEAN framework. A workflow may be specified to include processing via one or more frameworks, plug-ins, add-ons, etc. A workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

Figure 2:
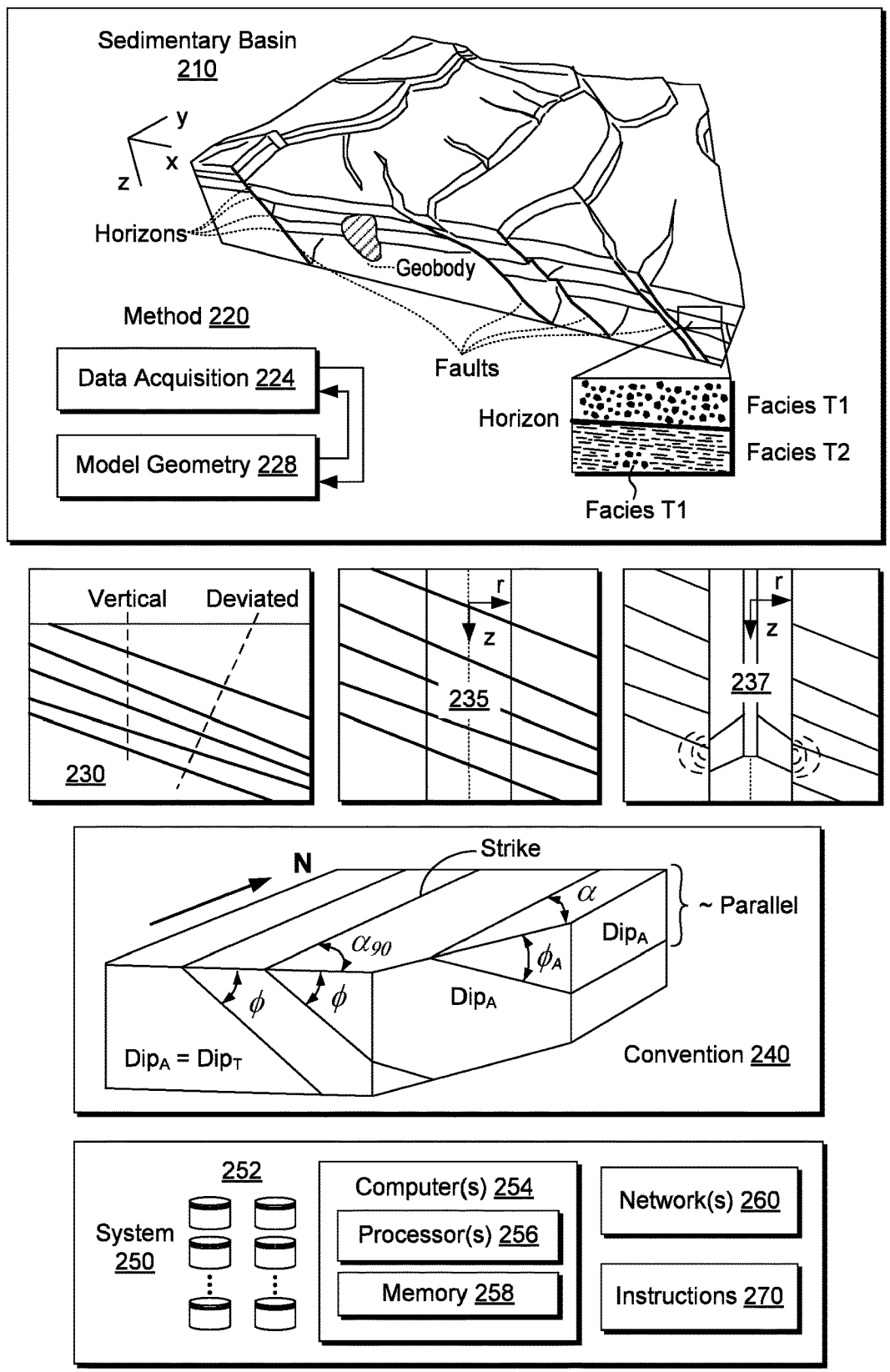
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD framework (Schlumberger Limited, Houston, Texas) includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG framework (Schlumberger Limited, Houston, Texas). The TECHLOG framework includes: core systems features such as BASE, C-Data-API, CoreDB, Real Time, TechData-Plus, TechStat, and Viewer; geology features such as Advanced Plotting, Field Map, Ipsom, K.mod, and Wellbore Imaging (Wbi); geomechanics features such as Completion Geomechanics, Pore Pressure Prediction, and Wellbore Stability; geophysics features such as Acoustics and Geophy; petrophysics features such as 3D Petrophysics, Acoustics, Nuclear Magnetic Resonance (NMR), Quanti., Quanti.Elan, TechCore and Thin Bed Analysis (TBA); production features such as Cased Hole, Production Logging, and Wellbore Integrity; reservoir engineering features such as Fluid Contact, Formation Pressure, Saturation-Height Modeling (SHM), and TechCore; and shale features such as Unconventionals and Quanti.Elan.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in another direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A = Dip_T$ for angle $\alpha_{90}$ with respect to the strike). As indicated, dip observed in a cross-section in another direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in another orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1).

As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 3:
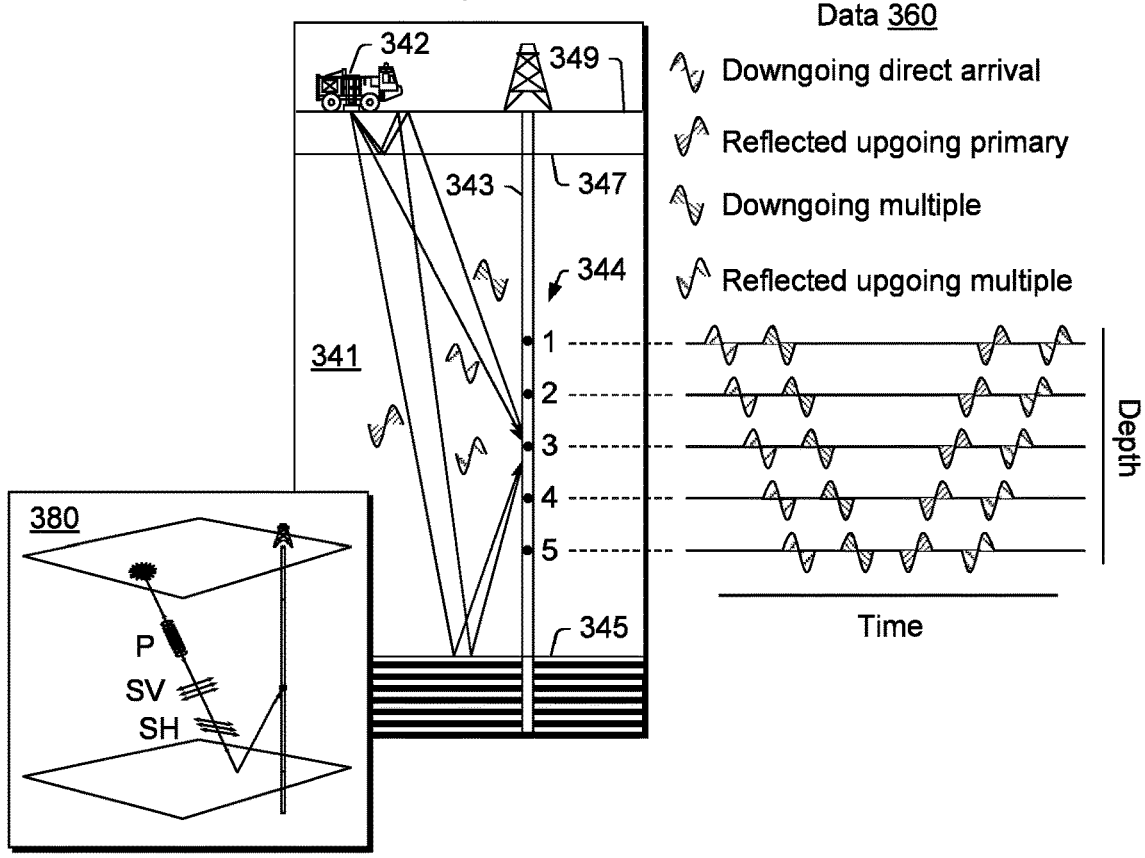
FIG. 3 illustrates an example of a technique that may acquire data.
Figure 3:
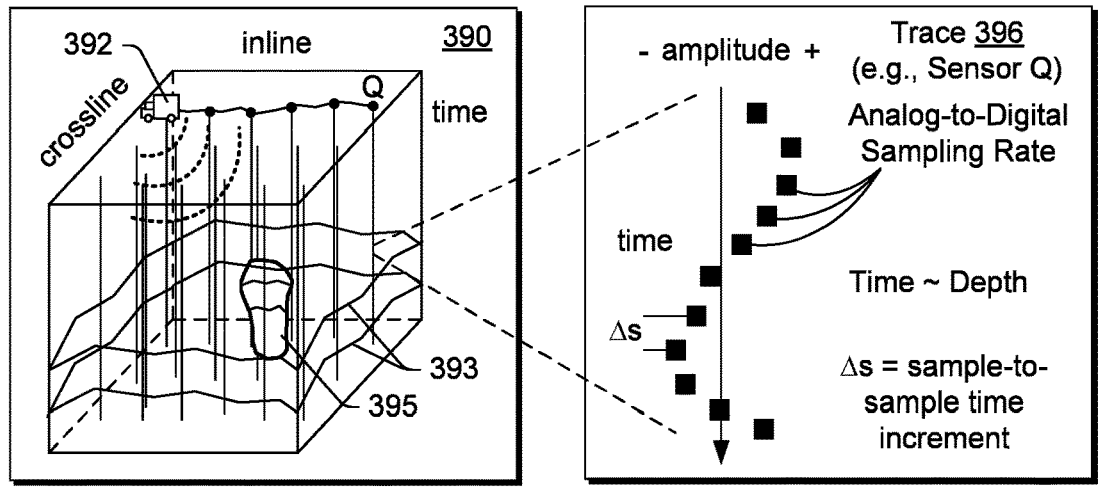

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy, etc.), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
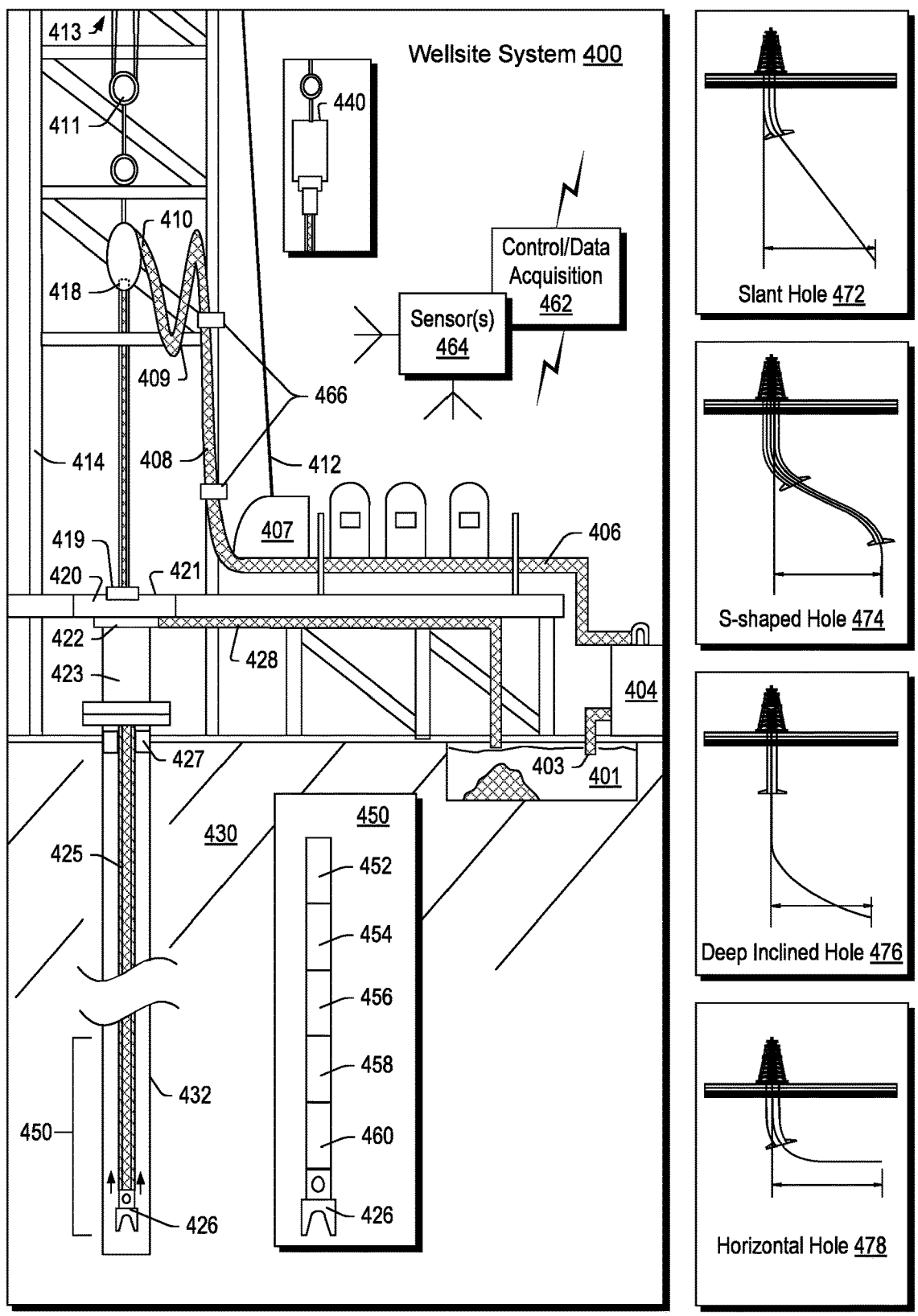
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPs) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the traveling block 411 and the derrick 414 positioned over the borehole 432. As mentioned, the wellsite system 400 can include the rotary table 420 where the drillstring 425 passes through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via a the lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a rotary steerable system and motor 460 (RSS), and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 454 may include equipment for generating electrical power, for example, to power various components of the drillstring 425. As an example, the MWD tool 454 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

As to a RSS, various types of suitable rotary steerable tool configurations may be used. For example, a RSS may include a substantially non-rotating (or slowly rotating) outer housing employing blades that engage the wellbore wall. Engagement of the blades with the wellbore wall is intended to eccenter the tool body, thereby pointing or pushing the drill bit in a desired direction while drilling. A rotating shaft deployed in the outer housing transfers rotary power and axial weight-on-bit to the drill bit during drilling. Accelerometer and magnetometer sets may be deployed in the outer housing and therefore are non-rotating or rotate slowly with respect to the wellbore wall. As an example, a RSS such as the POWERDRIVE rotary steerable systems (Schlumberger Limited, Houston, Texas) can fully rotate with a drill string (e.g., an outer housing rotates with the drill string). As an example, a RSS can make use of an internal steering mechanism that can operate without demand of contact with a wellbore wall and can enable a tool body to fully rotate with the drill string. As an example, a RSS can include features that provide for the use of mud actuated blades (or pads) that contact a wellbore wall. The extension of the blades (or pads) can be rapidly and continually adjusted as such a system rotates in a wellbore. As an example, a RSS can include and make use of a lower steering section joined at a swivel with an upper section. Such a swivel can be actively tilted via pistons so as to change angle of a lower section with respect to the upper section and maintain a desired drilling direction as the BHA rotates in a wellbore. As an example, one or more accelerometer and magnetometer sets may rotate with the drill string or may alternatively be deployed in an internal roll-stabilized housing such that they remain substantially stationary (in a bias phase) or rotate slowly with respect to the wellbore (in a neutral phase). To drill a desired curvature, the bias phase and neutral phase can be alternated during drilling at a predetermined ratio (referred to as the steering ratio (SR)).

As an example, deviation of a bore may be accomplished in part by use of a downhole motor and/or a turbine. As to a motor, for example, a drillstring can include a positive displacement motor (PDM). The deviation may also be accomplished by using a rotary steerable system (RSS).

FIG. 4 also shows some examples of types of holes that may be drilled, for example, with a deviated bore. As shown in FIG. 4, the examples include a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

Figure 5:
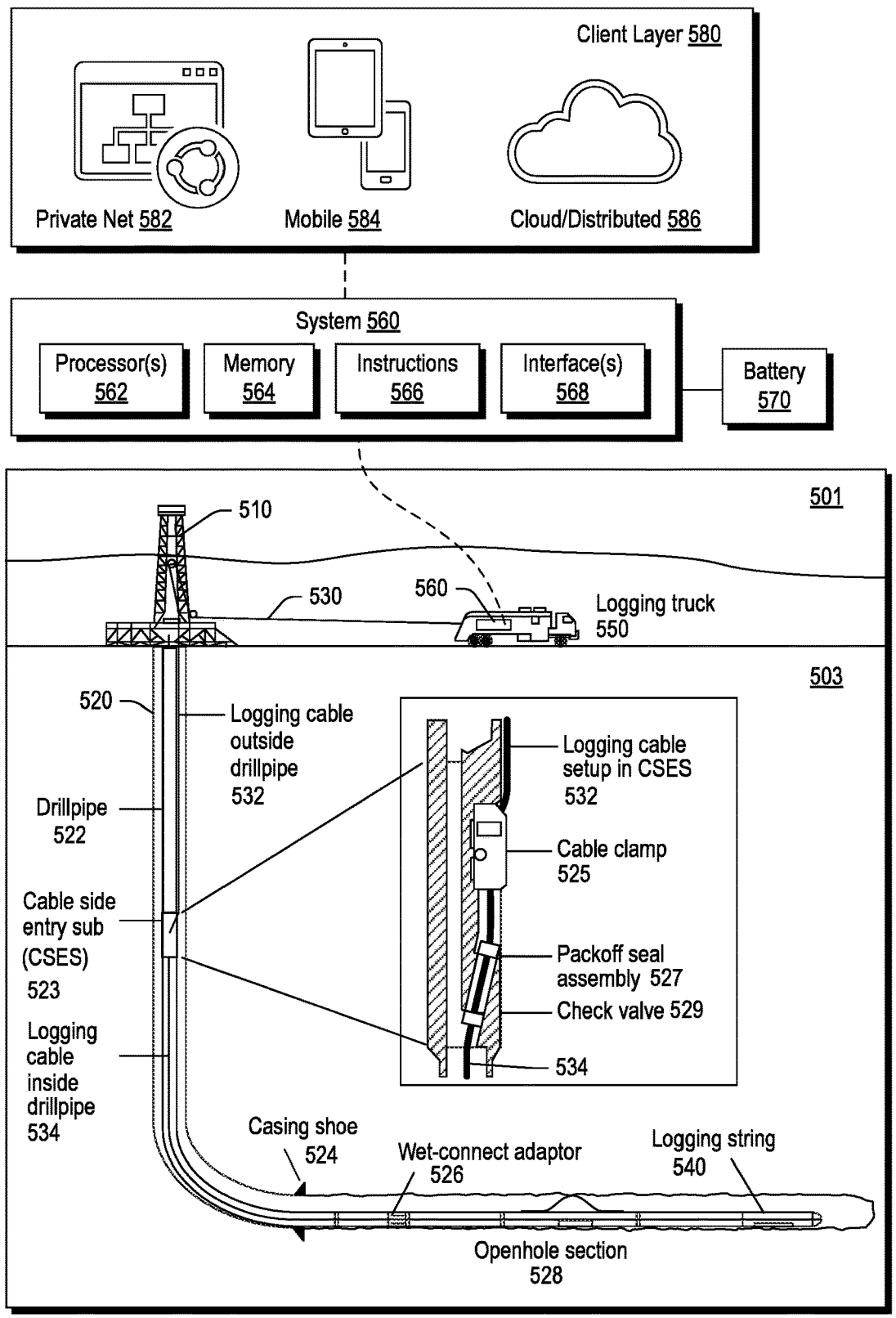
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, a seismic workflow may provide for processing of microseismic data as a type of seismic data. Microseismic monitoring (e.g., a type of seismic survey) provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations as part of a seismic interpretation workflow.

Integrated workflows leveraging multi-scale, multi-domain measurements and microseismic interpretation can allow for optimization of hydraulic fracturing treatment for increased production. Such integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow can include performing a seismic survey, which may be land-based, sea-based (e.g., vessel, ocean bottom, etc.) or land and sea-based. As an example, a seismic survey can include an acquisition geometry where receivers and/or sources are positioned according to the acquisition geometry. As an example, a seismic survey may be performed using one or more receivers and/or one or more sources positioned in a subterranean environment, for example, in a borehole. As an example, a workflow can include acquiring various types of data, which may include seismic data as a type of data and one or more other types of geophysical data, which may include imagery data (e.g., borehole imagery, satellite imagery, drone imagery, etc.).

As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

As an example, a workflow may involve forward modeling and/or inverting (e.g., an inversion). Forward modeling may progress from an earth model of acoustic impedance and an input wavelet to a synthetic seismic trace while an inversion may progress from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Texas) may be implemented to perform an inversion. As an example, a framework such as the Linearized Orthotropic Inversion framework (Schlumberger Limited, Houston, Texas) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

As an example, data such as seismic data may be processed using a computational framework that can include one or more processors and memory, as well as, for example, one or more interfaces. A computational framework may include one or more features of the OMEGA framework (Schlumberger Limited, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

A computational framework may include features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

A framework may include features for geophysics data processing. As an example, a framework may allow for processing various types of data such as, for example, one or more of: land, marine, and transition zone data; time and depth data; 2D, 3D, and 4D surveys; isotropic and anisotropic (TTI and VTI) velocity fields; and multicomponent data.

As an example, a framework may allow for transforming seismic, electromagnetic, microseismic, and/or vertical seismic profile (VSP) data into actionable information, for example, to perform one or more actions in the field for purposes of resource production, etc. A framework may extend workflows into reservoir characterization and earth modelling. For example, a framework may extend geophysics data processing into reservoir modelling by integrating with the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 700 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

As an example, a workflow can include implementing a computational simulator, a field controller, etc. For example, a computational simulator such as a reservoir simulator can generate simulation results as to one or more physical phenomena (e.g., fluid flow, etc.) in a reservoir. As to a field controller, a workflow can include issuing one or more instructions to one or more pieces of field equipment as part of a control process, which may create a bore, deepen a bore, convey a tool in a bore, generate a fracture, reactive an existing fracture, treat a formation (e.g., a wall of a borehole), etc. In certain embodiments, this approach may reduce the time spent on interpretation in reservoir characterization studies while increasing quality and productivity, while reducing cost. A reservoir characterization can be more accurate when utilizing one or more automated interpretation techniques.

Stratigraphy involves the study of the history, composition, relative ages and distribution of strata, and the interpretation of strata to elucidate Earth history for one or more purposes. The comparison, or correlation, of separated strata can include study of their lithology, fossil content, and relative or absolute age, or lithostratigraphy, biostratigraphy, and chronostratigraphy.

Rocks that were formed during the periods of geologic time can be called systems and bear the same names as those of the periods. Hence, rocks of the Permian System were deposited during Permian time or in the Permian Period; rocks of the Cambrian System were formed during the Cambrian Period, etc. It can be useful to assign rocks to smaller divisions. Rocks that are placed within a major division of a system are said to constitute a series, which may be called lower, middle, upper, or which may be given a geographic name. In parts of the geologic section, nomenclature can be utilized to assign strata to still smaller divisions, and hence stages can be used as smaller and/or more local divisions within a series.

A rock-stratigraphic unit or simply stratigraphic unit is a subdivision of rocks that can be delimited on the basis of lithologic characteristics. Rock-stratigraphic units can be divided into groups, formations, members, and beds. A formation is the fundamental unit in this division. A group is the next higher ranking unit and may include two or more formations. A member is a subdivision of a formation. A bed tends to be used as the smallest subdivision in rock-stratigraphic classification.

As to some examples of terms that can be utilized in assessing stratigraphy, consider true vertical thickness, which is the thickness of a bed or rock body measured vertically at a point. As an example, values of true vertical thickness in an area can be plotted and contours drawn to create an isochore map. Another term is true stratigraphic thickness, which is the thickness of a bed or rock body after adjusting for the dip of the bed or body and, for example, deviation of a well that penetrates it. The values of true stratigraphic thickness in an area can be plotted and contours drawn to create an isopach map. An isopach map is a contour map that can connect points of approximately equal thickness. For example, in such a map, isopachs or contours that make up an isopach map can be rendered to a display to show the stratigraphic thickness of a rock unit (e.g., as opposed to the true vertical thickness). Isopachs can be defined as showing the true stratigraphic thicknesses such as the thickness perpendicular to bedding surfaces.

Figure 6:
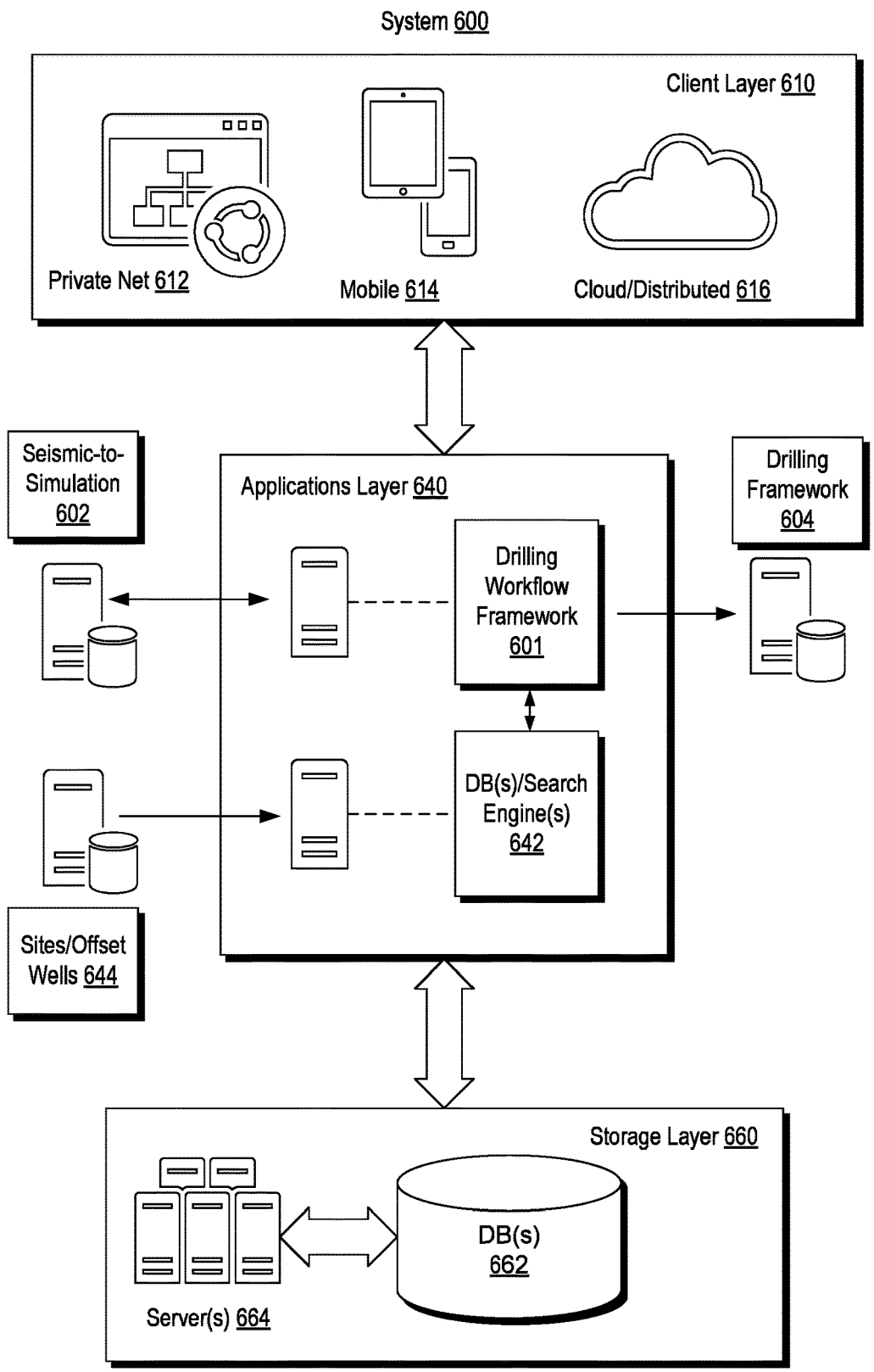
FIG. 6 illustrates an example of a system.

FIG. 6 shows an example of a system 600 that includes a drilling workflow framework 601, a seismic-to-simulation framework 602, a drilling framework 604, a client layer 610, an applications layer 640, a source or sources of site information that can include offset well information 644 (e.g., one or more databases, etc.) and a storage layer 660. As shown the client layer 610 can be in communication with the applications layer 640 and the applications layer 640 can be in communication with the storage layer 660.

The client layer 610 can include features that allow for access and interactions via one or more private networks 612, one or more mobile platforms and/or mobile networks 614 and via the "cloud" 616, which may be considered to include distributed equipment that forms a network such as a network of networks.

In the example of FIG. 6, the applications layer 640 includes the drilling workflow framework 601. The applications layer 640 also includes a database management component 642 that includes one or more search engines modules.

As an example, the database management component 642 can include one or more search engine modules that provide for searching one or more information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 6, the applications layer 640 can include communicating with one or more resources such as, for example, the seism ic-to-simulation framework 602, the drilling framework 604 and/or one or more sites, which may be or include one or more offset wellsites. As an example, the applications layer 640 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 6, the storage layer 660 can include various types of data, information, etc., which may be stored in one or more databases 662. As an example, one or more servers 664 may provide for management, access, etc., to data, information, etc., stored in the one or more databases 662. As an example, the database management component 642 may provide for searching as to data, information, etc., stored in the one or more databases 662.

As an example, the database management component 642 may include features for indexing, etc. As an example, information may be indexed at least in part with respect to wellsite. For example, where the applications layer 640 is implemented to perform one or more workflows associated with a particular wellsite, data, information, etc., associated with that particular wellsite may be indexed based at least in part on the wellsite being an index parameter (e.g., a search parameter).

As an example, the system 600 of FIG. 6 may be implemented to perform one or more portions of one or more workflows associated with equipment such as that of FIG. 1, 2, 3, 4 or 5. As an example, the drilling workflow framework 601 may interact with a technical data framework and the drilling framework 604 before, during and/or after performance of one or more drilling operations. In such an example, the one or more drilling operations may be performed in a geologic environment (see, e.g., the environment 150 of FIG. 1, the sedimentary basin 210 of FIG. 2, etc.) using one or more types of equipment.

As an example, an architecture utilized in a system such as, for example, the system 600 may include features of the AZURE architecture (Microsoft Corporation, Redmond, WA). As an example, a cloud portal block can include one or more features of an AZURE portal that can manage, mediate, etc. access to one or more services, data, connections, networks, devices, etc. As an example, the system 600 may include features of the GOOGLE cloud architecture (Google, Mountain View, CA). As an example, a system may utilize one or more application programming interfaces associated with a cloud platform (e.g., GOOGLE cloud APIs, etc.).

As an example, the system 600 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 7:
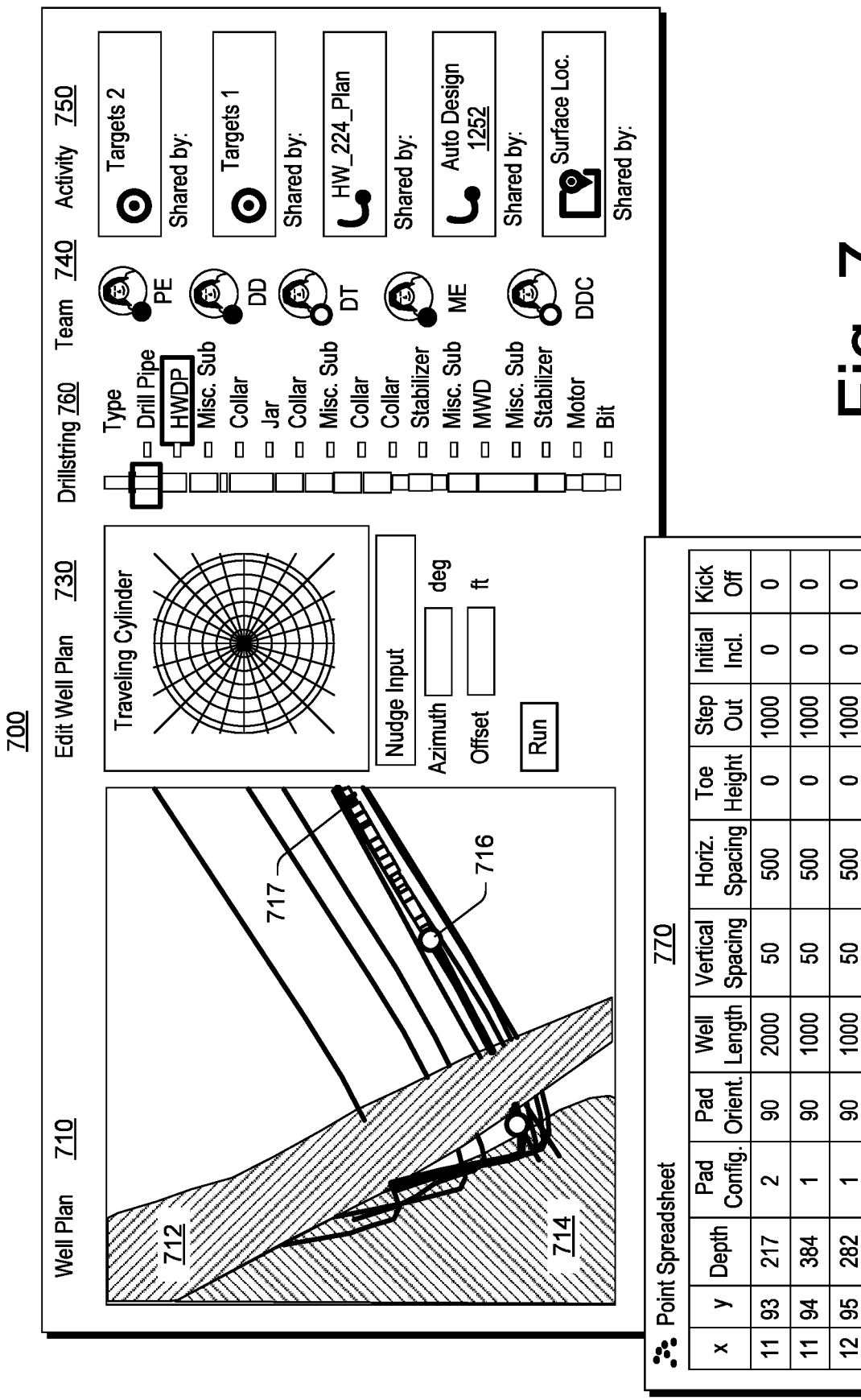
FIG. 7 illustrates an example of a graphical user interface.

FIG. 7 shows an example of a graphical user interface (GUI) 700 that includes information associated with a well plan. Specifically, the GUI 700 includes a window 710 where surfaces representations 712 and 714 are rendered along with well trajectories where a location 716 can represent a position of a drillstring 717 along a well trajectory. The GUI 700 may include one or more editing features such as an edit well plan set of features 730. The GUI 700 may include information as to individuals of a team 740 that are involved, have been involved and/or are to be involved with one or more operations. The GUI 700 may include information as to one or more activities 750. As shown in the example of FIG. 7, the GUI 700 can include a graphical control of a drillstring 660 where, for example, various portions of the drillstring 760 may be selected to expose one or more associated parameters (e.g., type of equipment, equipment specifications, operational history, etc.). FIG. 7 also shows a table 770 as a point spreadsheet that specifies information for a plurality of wells. For example, the point spreadsheet can include coordinates, dimensions, etc., that specify a trajectory of a well, spacing of wells, etc.

Figure 8:
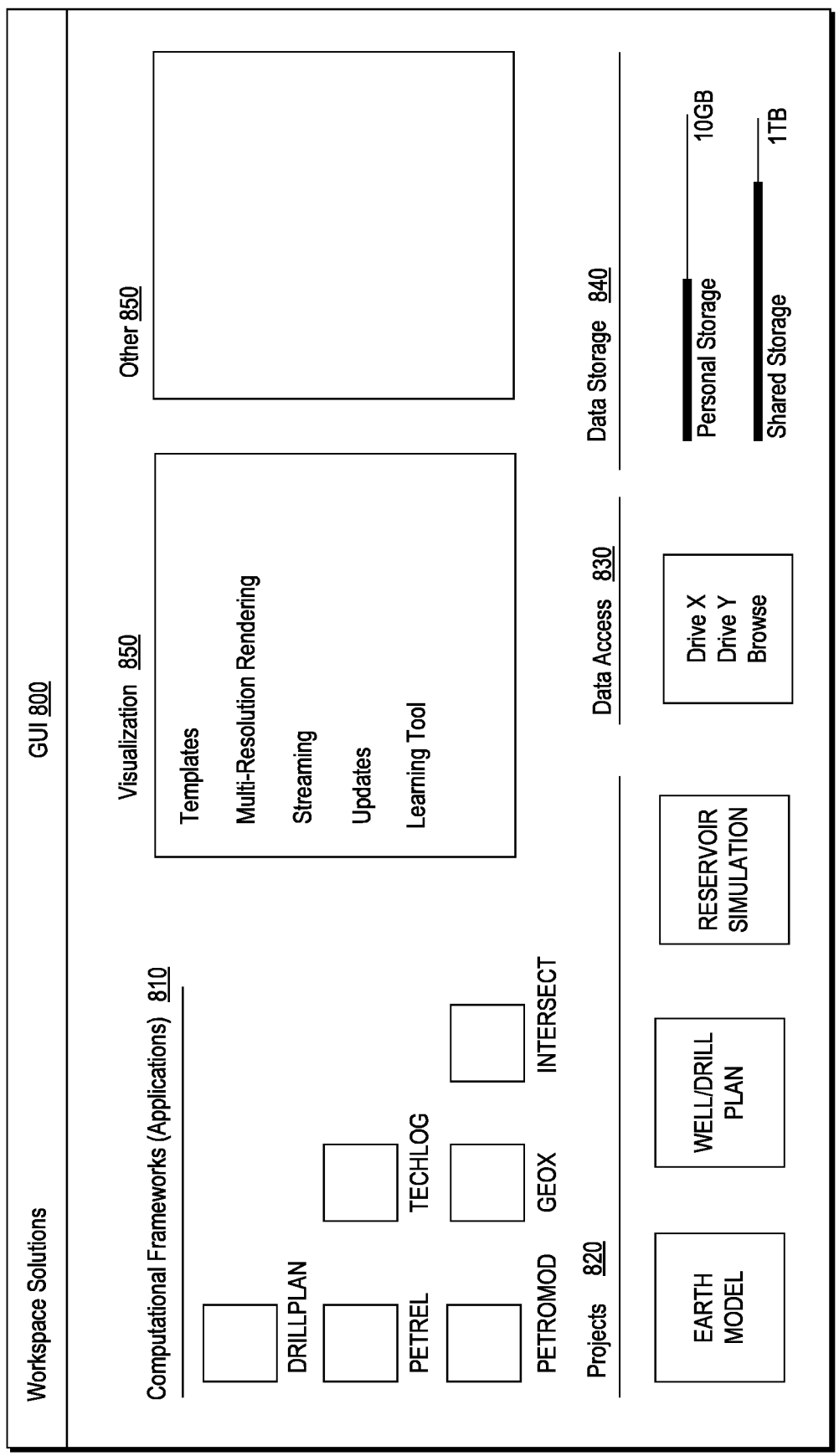
FIG. 8 illustrates an example of a graphical user interface.

FIG. 8 shows an example of a GUI 800 that includes various features that can be part of a workspace. For example, a computational framework area 810 includes icons that represent various types of computational frameworks such as a drilling plan framework, a seismic-to-simulation framework (e.g., PETREL framework, Schlumberger Limited, Houston, Texas), a measurements framework (e.g., TECHLOG framework, Schlumberger Limited, Houston, Texas), a mechanical earth modeling (MEM) framework (PETROMOD framework, Schlumberger Limited, Houston, Texas), an exploration risk, resource, and value assessment framework (e.g., GEOX, Schlumberger Limited, Houston, Texas), and a reservoir simulation framework (INTERSECT, Schlumberger Limited, Houston, Texas). As an example, one or more computational frameworks may be suitable for use in a system such as the system 600 of FIG. 6, the wellsite system 400 of FIG. 4, the system 500 of FIG. 5, the seismic acquisition equipment of FIG. 3, etc. The GUI 800 can include a projects area 820 for various types of projects, a data access area 830 for accessing data, a data storage area 840 for rendering graphics associated with data storage, a visualization area 850 for controlling rendering of graphics, data, text, etc., as associated with one or more projects, and another area 860 for one or more other types of features as may be associated with one or more projects and/or one or more sets of data.

In the example of FIG. 8, the GUI 800 may expose one or more resources. As an example, a remote resource may be managed using a cloud platform. For example, consider a GOOGLE cloud platform (Google LLC, Mountain View, California), an AMAZON WEB SERVICES (AWS) cloud platform (Amazon, Seattle, Washington), a MICROSOFT AZURE cloud platform (Microsoft Corporation, Redmond, Washington), etc.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semistructured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor may generate time series data, which may be regular and/or irregular in time and which may or may not include a "global" time marker (e.g., time stamps, etc.). As an example, data may be in a WITSML standard, which is a standard utilized in various operations including rig operations. As an example, data may be serially transferred ASCII data.

In the example of FIG. 8, one or more of the computational frameworks may be local and/or one or more of the computational frameworks may be remote. For example, the GUI 800 may be rendered locally using a display operatively coupled to a workstation (e.g., laptop, desktop, etc.) where the workstation includes executable instructions for instantiating a computational framework and/or the GUI 700 may be rendered locally using a display operatively coupled to or part of a computing device that includes one or more network interfaces that can operatively couple to one or more remote resources that can instantiate a computational framework.

As explained, some features may be local and some features may be remote and various features may be within a common platform such as a cloud platform.

In the example of FIG. 8, the GUI 800 includes the visualization area 850, which lists some examples of features that may be available. For example, consider a template feature that can be actuated to commence a process for generating a template for visualizations as may be applied to one or more of the applications of the computational frameworks 810. As an example, a template can specify how rendering is to occur by one or more of such computational frameworks. In such an example, the template can specify parameters, parameter values, etc., that can harmonize how items, objects, etc., are rendered to a display. For example, consider a horizon as an object that may be available in the PETREL and TECHLOG computational frameworks. A template may specify that the horizon is to be rendered using a particular color such that a window with renderings of the PETREL computational framework that include the horizon utilize the same color for the horizon as in a window with renderings of the TECHLOG computational framework that include the horizon. In such an approach, a user may readily identify the horizon in multiple windows of different computational frameworks through use of a common color as specified by a multi-computational framework template.

While color is mentioned as an example, a template can include other specifications such as, for example, consider one or more of window arrangement, window size, text style, text size, language, graphical control style, keystroke commands, etc.

As an example, the visualization area 850 can include one or more of a multi-resolution rendering feature, a streaming feature, an update feature, and a learning tool feature. Such features may provide for rendering various types of visualizations, optionally for workflow specific tasks (e.g., interpretation, quality control, field control, data management, etc.).

As an example, a system such as, for example, the system 600 of FIG. 6 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 800 of FIG. 8 may be a GUI of the DELFI framework.

Figure 9:
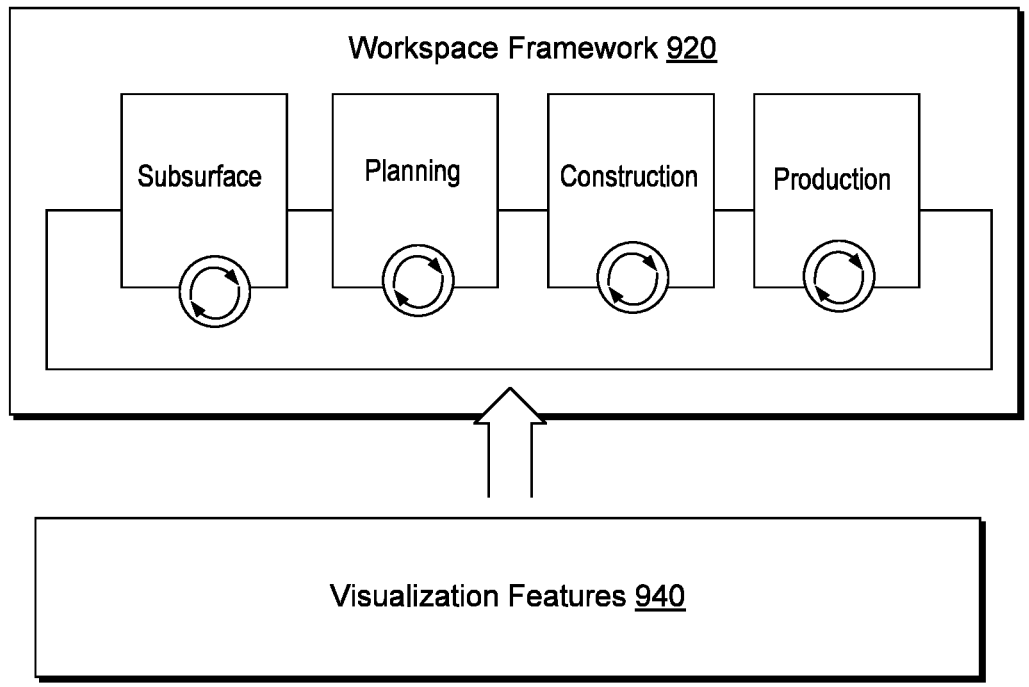
FIG. 9 illustrates an example of a system.

FIG. 9 shows an example of a system 900 that includes a workspace framework and visualization features 940. As an example, one or more of the visualization features 940 may be implemented via the workspace framework 920, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores.

Figure 10:
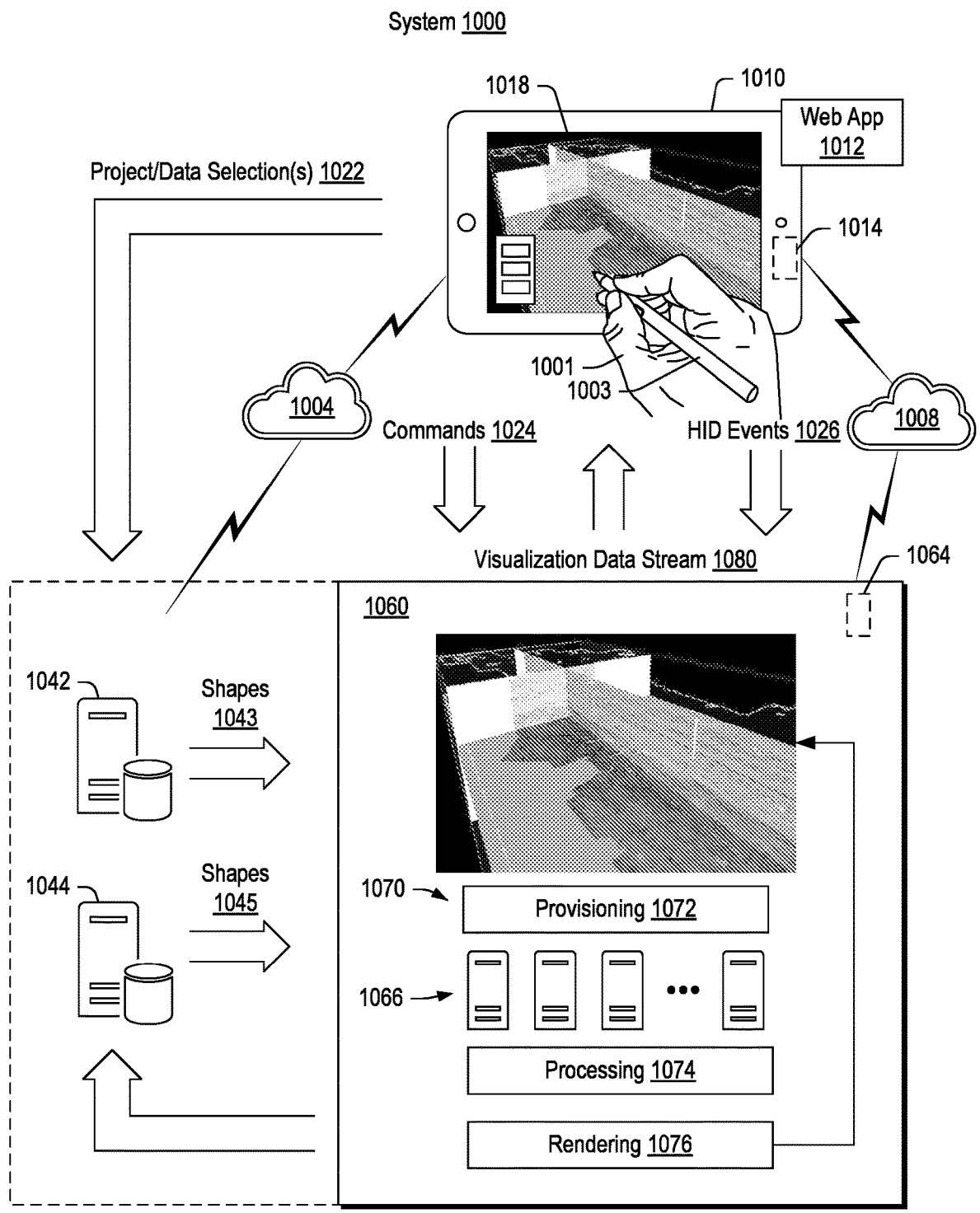
FIG. 10 illustrates an example of a system.

FIG. 10 shows an example of a system 1000 that includes various types of equipment as may be in a client-server type of architecture. As shown in the example of FIG. 10, a user 1001 can utilize a human input device (HID) 1003 for various types of system interactions where such system interactions can be communicated via one or more cloud platforms 1004 and 1008, which may be a common cloud platform. In the example of FIG. 10, the user 1001 can interact with a client device 1010 using the HID 1003, which may be a mouse, a finger, a stylus, a keyboard, a trackball, a trackpad, voice commands, etc. As shown, the client device 1010 includes a web application 1012 executable using a processor and memory of the client device 1010 where the client device 1010 may receive and transmit information via one or more interfaces 1014. For example, the client device 1010 can utilize one or more protocols for transmission and/or receipt of information, which may be via one or more of the one or more cloud platforms 1004 and 1008. The client device 1010 also includes a display 1018, which may be utilized for rendering visualizations, graphical user interfaces (GUIs), etc.

In the example of FIG. 10, the user 1010 may utilize the HID 1003 to cause the client device 1010 to transmit one or more project and/or data selections 1022, which may be directed to and received by one or more data stores 1042 and 1044, which may provide for access to, generation of, etc., one or more types of shapes 1043 and 1045, which may be specified according to JSON or another specification (e.g., shape information, structured shape information, etc.). As an example, a shape may be a shape associated with a model of a portion of the Earth. For example, the system 1000 may be utilized in a workflow that pertains to building of a model using seismic data acquired for a geologic region. As an example, the system 1000 may be utilized to implement an interactive method for building a model based at least in part on data acquired via one or more types of sensors, field operations, etc. FIG. 10 also shows generation of commands 1024 and HID events 1026 (e.g., a type of command, etc.), which may be generated via interactions between the user 1001 and the client device 1010. As to the commands 1024, these may be menu commands, for example, from selections made as to one or more menus of one or more graphical user interfaces rendered to the display 1018 of the client device 1010.

In the example of FIG. 10, various resources are shown via a block 1060 where such resources can be cloud-based resources as associated with one or more of the one or more cloud platforms 1004 and 1008. In the example of FIG. 10, the resources of the block 1060 can be remote from the client device 1010 and part of a client-server architecture. As shown, the block 1060 includes one or more interfaces 1064, which can be configured to receive information transmitted by the client device 1010 and/or the one or more data stores 1042 and 1044, which can include one or more processors for execution of one or more applications, which may provide for data processing, data formatting, etc. The block 1060 also includes one or more servers 1066, which can include multi-core servers with associated memory. As an example, the block 1060 may include the one or more data stores 1042 and 1044 (see, e.g., dashed line). As an example, the one or more data stores 1042 and 1044 may provide data and/or structured shape information. In the example of FIG. 10, one or more resources may issue a request or requests to the one or more data stores 1042 and 1044; noting that such resources may be in a common cloud platform.

In the example of FIG. 10, an example method 1070 is shown within the block 1060 as including a provision block 1072 for provisioning resources, a processing block 1074 for processing data and/or information, and a render block 1076 for generating visualization data, which may be a single visualization or a time series visualization (e.g., video, etc.), where the visualization data can be streamed as a visualization data stream 1080 to the client device 1010, for example, via one or more of the one or more cloud platforms 1004 and 1008. For example, the user 1001 may interact with the client device 1010 such that various resources of the block 1060 generate the visualization data stream 1080 where the client device 1010 can receive the visualization data stream 1080, or at least a portion thereof, and generate a visual rendering on the display 1018. As mentioned, such a visual rendering may pertain to a model building and/or model editing workflow where interactions can be successive (e.g., iterative) such that the user 1001 is in control of the workflow using the client device 1010 where responses to individual interactions or grouped interactions can be of relatively low latency through appropriate provisioning of resources per the provisioning block 1072 of the method 1070. As to low latency, responses that result in local rendering to the display 1018 of the client device 1010 may be of the order of seconds or less and may be of the order of one second or less. In such an approach, the user 1001 may be actively engaged in model building and/or model editing where visualizations rendered to the display 1018 of the client device 1010 change rapidly responsive to interactions, which may include visualizations that increase in resolution responsive to zoom interactions, visualization that change in perspective responsive to movement of a view control (e.g., camera view control, etc.), visualizations that change as to model features responsive to drawing of a line (e.g., a layer, a boundary, etc.), etc.

As an example, the web app 1012 may include one or more features that allow the user 1001 to select a level of resource utilization. For example, where a dataset exceeds a certain size, the user 1001 may interact with the web app 1012 to cause the provision block 1072 of the block 1060 to increase a maximum number of servers, cores, memory, etc. As an example, upon selection of a projection and/or data per the projection and/or data selection 1022, the block 1060 may respond automatically to allow for extensibility of provisioning per the provision block 1072 such that the user 1001 does not experience undesirable latency when interacting with the project and/or data. As an example, where the block 1060 experiences a decreasing rate in interactions or an interaction backlog in relationship to one or more outgoing visualization data streams (see, e.g., the visualization data stream 1080), the provision block 1072 may increase resources available to assure that the decreasing rate in interactions and/or the interaction backlog is/are not due to insufficient provisioning of resources. In such an approach, the user 1001 may be assured that the user experience will be more of a real-time experience where an interaction entered via the client device 1010 quickly results in an updated visualization on the display 1018 of the client device 1010.

As shown in the example of FIG. 10, the client device 1010 may be a mobile device (e.g., a tablet, a laptop, a smartphone, etc.) such that it may be suitable for use in the field, for example, at a site where geophysical and/or other data are being acquired, where operations are being performed (e.g., drilling, fracturing, etc.), etc. In such an example, model building, editing, etc., may be performed in an interactive manner using the client device 1010 as in communication with various resources, which can be remote resources as associated with one or more of the one or more cloud platforms 1004 and 1008. For example, consider a logging operation that acquires data as to stratigraphy of a geologic region via an imaging tool where the user 1001 may be onsite and can view the data (e.g., borehole images, etc.) and build and/or edit a model of the geologic region based on an interpretation of the stratigraphy. In such an example, the model may be built and/or edited on-the-fly. For example, consider viewing data from the imaging tool on the display 1018 and/or on another display, optionally in combination with seismic data for the geologic region, to cause a model building framework to generate or move a layer in a 3D model where the layer may correspond to a horizon or other geologic structure as indicated by the data from the imaging tool. As another example, consider a core sample that is onsite where the user 1001 may capture an image of the core sample using a camera of the client device 1010 and render the image to the display 1018, where the image may optionally be transmitted to remote resources for processing to identify various layers. In such an example, the user 1001 can perform various interactions with the client device 1010 to further a model building and/or model editing workflow. For example, the user 1001 may zoom-in on a portion of seismic data where the zoom-in interaction results in receipt of an appropriate visualization data stream and where the portion of seismic data, rendered to the display 1018, can be compared with layering in the core sample. In such an example, the user 1001 may orient an image of the core sample to directly compare it to the portion of the seismic data and then label the seismic data to cause a model building framework to generate a portion of an earth model (e.g., a layer or layers).

As shown in the example of FIG. 10, one or more of the data stores 1042 and 1044 may be involved in an interactive workflow where, for example, one or more shapes (e.g., data structures, etc.) can be integrated into the visualization data stream 1080. As mentioned, the one or more data stores 1042 and 1044 may be associated with a cloud-platform that is a common cloud-platform that includes resources of the block 1060. As an example, different cloud-platforms may be utilized, for example, one for data storage and another for application framework execution. In such an example, features can be included for making inter-platform calls and generating inter-platform responses. As an example, a common platform approach may help to reduce latency experienced by a user such as a user of the client device 1018.

As an example, the web app 1012 can be a web-based application that can be implemented using features of the client device 1010 as operatively coupled to a network such as, for example, the Internet, to provide for interactions with a server or servers, which may be accessible through a cloud platform. For example, the web app 1012 can be an application that can execute within a client operating system environment (e.g., client device OS environment) to issue instructions to cloud resources and receive information in response. Such an approach may utilize one or more application programming interfaces (APIs). For example, the web app 1012 may be utilized by the client device 1010 to issue an API call to a cloud platform where cloud resources respond to the API call by returning information to the client device. As an example, the visualization features 940 of the system 900 of FIG. 9 may include one or more API related features.

Referring to FIG. 10, the web app 1012 is shown as issuing commands (e.g., API calls, etc.) to a server side rendering service that utilizes various resources of the block 1060, which may be implemented using cloud platform resources. Further, the web app 1012 is shown as making data selections such as selecting data from one or more of the data stores 1042 and 1044. Such data stores may store various types of data. For example, consider a data store that can store seismic data. As an example, a data store may be a cloud-based data store or, for example, a data store operatively coupled to cloud platform resources (e.g., directly or indirectly). As an example, one or more of the data stores 1042 and 1044 may provide for data processing such as, for example, attribute processing as associated with seismic attributes. As an example, one or more of the data stores 1042 and 1044 may provide for model building per a model building framework. In various examples, the system 1000 of FIG. 10 can utilize seismic data and model data where, for example, model data can include shape data, which may be, for example, in a vector graphics form, etc. (e.g., consider vector graphics utilized for rendering a visualization of line model of a geologic region, etc.).

As an example, a converter may be local to a data store and/or a converter of a cloud platform. Such a converter may operate to convert data of a data store to shapes. For example, consider a converter that can convert data of a data store to a shape or shapes with appropriate locations information. For example, consider a tile or a brick (e.g., a 2D, a 3D shape, etc.) that can be generated using data of a data store where the tile or the brick can have associated metadata, position data, etc. In such an example, the tile or the brick can be part of a hierarchy that can be utilized to construct a visualization (e.g., to render a visualization to a display). As an example, a hierarchy can be a tree structure such as, for example, a quadtree, an octree, etc. Such an approach can expedite rendering of visualizations that may be visualizations based on relatively large datasets. As an example, shapes may be provided to a rendering engine (e.g., a rendering service). Such a rendering engine may generate a stream that can be transmitted via a network to a client device that executes, for example, a web app (see, e.g., FIG. 10). In such an approach, the rendering engine can consume shapes, such as, for example, JSON format specified shapes, which can be organized into visualization data for streaming over a network and rendering at a destination (e.g., via graphics circuitry, etc.) of a receiving device.

As an example, one or more of the one or more data stores 1042 and 1044 may be provisioned with compute resources, for example, using the provisioning block 1072. In such an example, structured shape information (see, e.g., the shapes 1043 and 1045) may be generated. In such an example, compute resources can provide for one or more geometric engines for generating structured shape information that can be utilized by compute resources that can provide for one or more rendering engines that can generate one or more visualization data streams.

As an example, data may be converted into domain agnostic shapes, such as, for example, lines, polylines, pointsets, triangles, closed shapes, open shapes, etc. As an example, a shape may be colored, shaded, etc. As an example, an oil and gas type of object may be converted such objects to visualization objects according to one or more visualization frameworks.

In the example system 1000 of FIG. 10, the client device 1010 may operate without a demand for persistent local storage of a large amount of data. Rather, data can be streamed through use of resources of a cloud platform. For example, cloud platform resources of the block 1060 can execute a geometric engine that is running and "live" such that it is responsive to input received from one or more user interactions with the client device 1010 in generation of and streaming of visualization data. In such an example, a client device may be operable in a manner that is relatively independent of a dataset resolution. For example, cloud platform resources may generate visualizations that are of an appropriate resolution or resolutions for a workflow being performed by a user of the client device. In such an approach, resolution may be higher where and when demanded. For example, consider generating and streaming a first visualization data stream for a coarse rendering of a region and then streaming a second visualization data stream for a finder rendering of at least a portion of that region. In such an example, a structured approach may be utilized such as, for example, a tree structure where a large brick and be filled by smaller bricks and/or where a large tile can be filled by smaller tiles.

As to persistent data types of approaches, which find use with individual workstations, an entire dataset may be downloaded to the individual workstation before a user can commence a workflow. Such an approach can be time consuming and also put the entire dataset at risk of being misappropriated. For example, if a security issue exists for the individual workflow, the entire dataset may be taken; whereas, in a system such as the system 1000 of FIG. 10, the client device 1010 does not demand reception of an entire dataset in its memory; rather, interactions with the client device 1010 can provide for visualization data to be streamed to the client device 1010 on-the-fly, where little to no persistence of visualization is demanded by the client device 1010 and where little to no persistence of raw data of a dataset is demanded by the client device 1010. In various examples, a client device may operate without a demand for raw data of a dataset and, instead, operate with visualizations that can be based on the raw data of the dataset. As an example, a client device may operate with minimal cache demands when compared to an approach that waits for preparation of a complete visualization file that is cached and then rendered.

As mentioned, a visualization data stream can be generated and transmitted via a network interface to a client device where the client device can commence rendering of a visualization to its display upon receiving of the visualization data stream (e.g., a video stream, etc.). As an example, one or more commands may be issued by a client device during receipt of a visualization data stream where such a command or commands may instruct resources of a cloud platform to commence generation of one or more visualization data streams. For example, a system can provide for interactions with visualizations that are effectively "live". As an example, a command may cause resources of a cloud platform to halt streaming of a visualization data stream to provide priority to a new visualization data stream.

As explained with respect to the system 1000 of FIG. 10, resources in the block 1060 can include rendering resources that generate a customized visualization data stream such as the visualization data stream 1080. For example, customization may be via a build-from-scratch approach using data such as volumetric raw data (e.g., volumetric seismic data, etc.). As an example, resources may be appropriately provisioned such that processing per the block 1074 and/or rendering per the block 1076 can be performed in a manner that provides for low latency of interactions by the user 1001 of the client device 1010. As an example, the resources provisioned may provide for one or more compression techniques to be implemented, which may help to reduce latency in various circumstances, where the client device 1010 includes appropriate circuitry for purposes of decompression.

As an example, a system may be characterized by one or more bandwidths. For example, consider a digital bandwidth that may be suitable for characterizing an ability of a system to stream video data. As an example, a digital bandwidth may be stated as a bit rate or average bit rate after data compression, which may be defined as a total amount of data divided by a play time.

An example of a data compression technique utilized for media bandwidth reduction is the discrete cosine transform (DCT). DCT compression can substantially reduce the amount of memory and bandwidth demanded for digital signals, for example, DCT may be capable of achieving a data compression ratio of 100:1 when compared to uncompressed media.

Various standards exist for multimedia such as a high-definition standard (HD) and a 4K standard where the bandwidth for streaming can depend on the type of compression technique utilized. For example, using the H264 technique, HD can demand 3 Mbps and 4K 32 Mbps while using the H265 technique, HD can demand 1.5 Mbps and 4K 15 Mpbs.

As an example, a method can include performing a test or tests for bandwidth, which may be utilized to calibrate a system. Calibration may involve, for example, one or more of selecting a compression technique, provisioning one or more resources, determining threading characteristics, etc. As an example, a calibration may help to assure that a client device operates with relatively low latency, for example, to provide for interactive use of the client device to perform a workflow (e.g., a model building workflow, etc.). As an example, a system can be configured in a manner that makes it suitable for use with one or more types of client devices. As an example, a system may be configured for use with one or more types of client devices that operate a web app such as a browser application that can issue information and receive information, which can be streamed visualization data for rendering to a display by the client device.

As an example, for seismic volumetric and other types of volumetric data, data may be in a format such as a SEG type where a datum may be associated with a position in a volumetric array (e.g., a seismic cube). As an example, a system can access and determine a data format. As an example, a reader may be a specialized reader such as a SEG-Y reader, which may provide for reading data where such data may be directly or indirectly provided to a rendering engine.

As an example, a method can include multi-resolution rendering where data structures are divided into tiles, bricks, or tiles and bricks, etc. As an example, a method can utilize a level of detail (LOD) approach that can be created by combining data pieces according to a structure such as a tree structure (e.g., quadtree, octree, etc.). As an example, a method can include adaptive rendering that is responsive to a visualization control tool such as, for example, a camera tool. In such an example, adaptive rendering can, depending on tool parameters received, load portions of data asynchronously (e.g., asynchronous loading of tiles, bricks, tiles and bricks, etc.). As an example, a coarse resolution visualization data stream may be generated and transmitted followed by a finer resolution visualization data stream, which may optionally be ordered, for example, to render a particular region of interest with the finer resolution followed by one or more other regions (e.g., ranked with lesser interest, etc.).

As an example, a region may be a zone, where for a geologic environment with multiple zones, a zone may be characterized by properties such as physical properties. As an example, a method can include loading properties and then calling for processing of a region using the properties. For example, consider a method that includes seismic data processing (e.g., for depth migration, etc.).

As mentioned, data can be seismic data. A 3D seismic dataset can be referred to as a cube or volume of data; a 2D seismic data set can be referred to as a panel of data. To interpret 3D data, processing can be on the "interior" of the cube, which is a computation process because massive amounts of data are involved. For example, a 3D dataset can range in size from a few tens of megabytes to several gigabytes or more to several terabyte or more.

A 3D seismic data volume can include a vertical axis that is two-way traveltime (TWT) rather than depth and can include data values that are seismic amplitudes values. Such data may be defined at least in part with respect to a time axis where a trace may be a data vector of values with respect to time.

Acquired field data may be formatted according to one or more formats. For example, consider a well data format AAPG-B, log curve formats LAS or LIS-II, seismic trace data format SEG-Y, shotpoint locations data formats SEGP1 or UKOOA and wellsite data format WITS.

As to SEGY, which may be referred to as SEG-Y or SEG Y, is a file format developed by the Society of Exploration Geophysicists (SEG) for storing geophysical data. It is an open standard, and is controlled by the SEG Technical Standards Committee, a non-profit organization. The format was originally developed in 1973 to store single-line seismic reflection digital data on magnetic tapes. The most recent revision of the SEG-Y format was published in 2017, named the rev 2.0 specification and includes certain legacies of the original format (referred as rev 0), such as an optional SEG-Y tape label, the main 3200 byte textual EBCDIC character encoded tape header and a 400 byte binary header.

As an example, a format may be a native format or a converted format. As an example, a utility can be available within a framework for conversion. For example, consider conversion between SEG-Y and ZGY within or outside of the PETREL framework using a ZGY utility. Compared to SEG-Y, ZGY is organized differently and is compressed. As an example, a ZGY utility may include features to convert from ZGY to ZGY, e.g. to compress a cube even more, or to output uncompressed ZGY files. As an example, when a Seismic Server Admin loads ZGY, the data can be decompressed, and computations can be performed on decompressed data. The ZGY utility can include an ability to process multiple SEG-Y files in one batch.

The AAPG Computer Applications Committee has proposed the AAPG-B data exchange format for general purpose data transfers among computer systems, applications software, and companies. For log curves, the Schlumberger LIS (log information standard) has become a de facto standard, and extensions to it have been proposed. Another log data format called LAS, for log ASCII standard, has been proposed by the Canadian Well Logging Society. The UKOOA format is from the United Kingdom Offshore Operators Association. WITS is a format for transferring wellsite data (wellsite information transfer standard) as proposed by the International Association of Drilling Contractors (IADC).

A computational system may include or may provide access to a relational database management system (RDBMS). As an example, a query language such as SQL (Structured Query Language) may be utilized.

Figure 11:
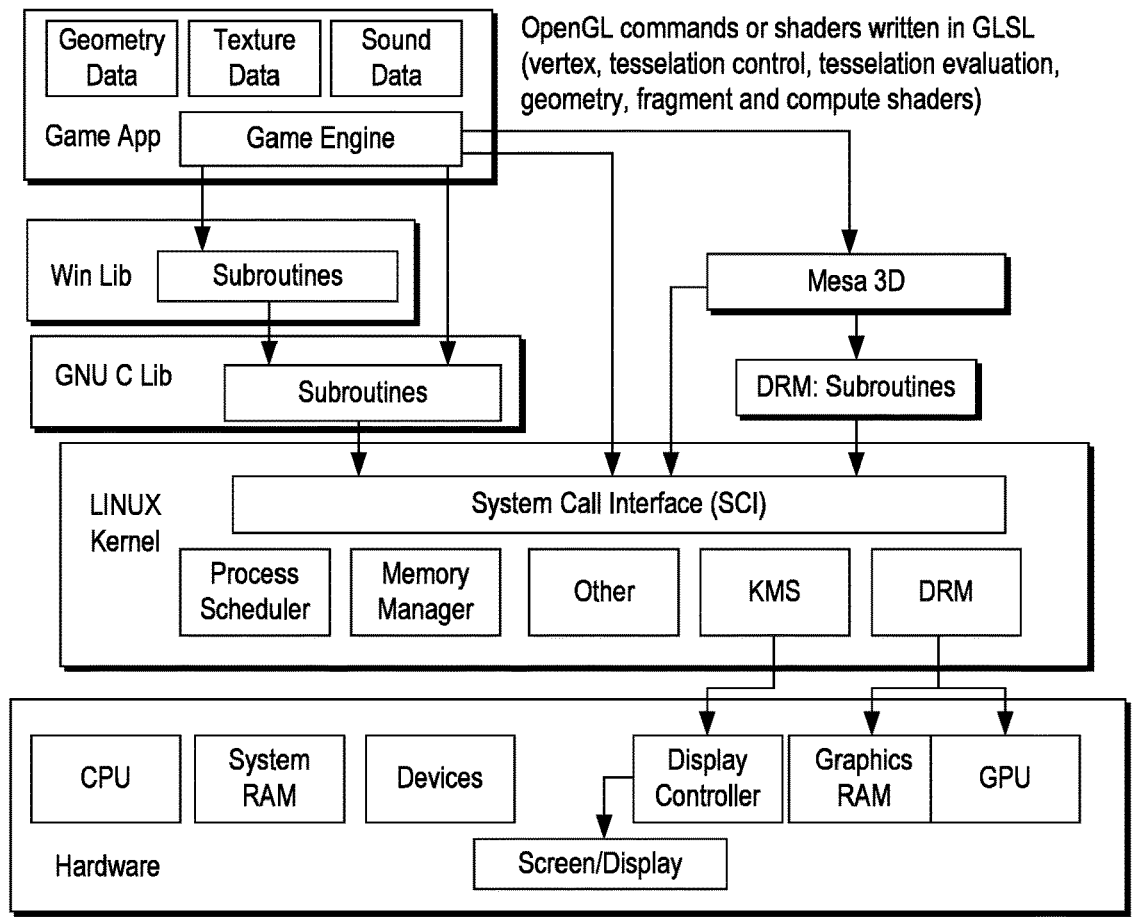
FIG. 11 illustrates examples of systems.
Figure 11:
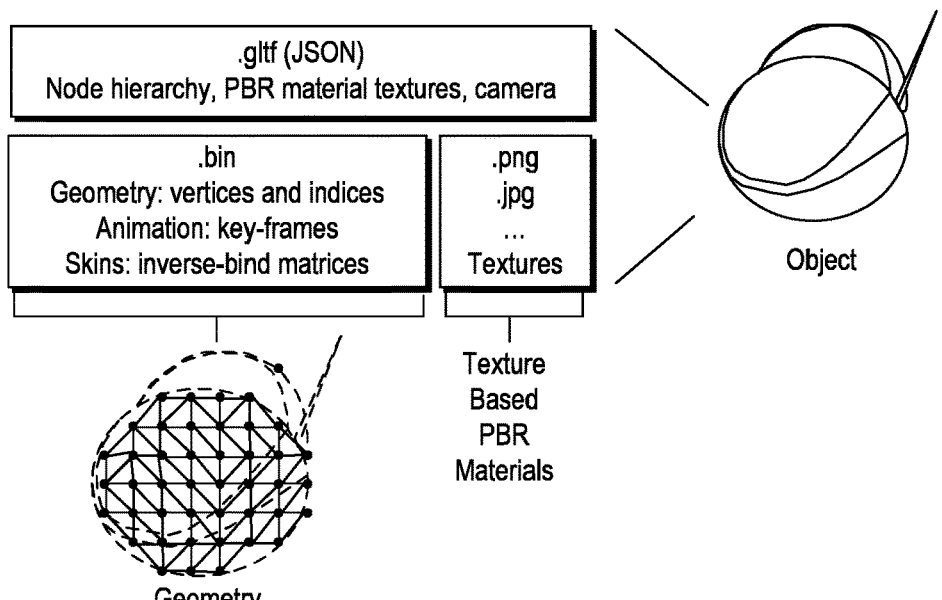

FIG. 11 shows an example of a system 1100 for the Open Graphics Library (OpenGL framework), which is a cross-language, cross-platform application programming interface (API) for rendering 2D and 3D vector graphics and FIG. 11 shows an example of a system 1110 for the GL Transmission Format (GLTF or .gltf) framework, which is a specification for efficient transmission and loading of 3D scenes and models by applications. GLTF can help to minimize both the size of 3D assets and the runtime processing to unpack and use those assets. GLTF defines an extensible, common publishing format for 3D content tools and services that streamlines authoring workflows and enables interoperable use of content across the industry. The OpenGL framework API can be used to interact with one or more central processing units (CPUs), one or more graphics processing unit (GPUs), etc., to achieve hardware-accelerated rendering. As an example, various resources of FIG. 10 can include one or more features of the system 1100 for the OpenGL framework and/or the system 1110 for the GLTF framework. As shown in FIG. 11, the OpenGL framework and/or the GLTF framework can include features for 3D computer games. As an example, a system can include features for oil and gas computational frameworks (e.g., via DELFI environment, etc.). As shown in FIG. 11, various types of .bin files, .png files, .jpg files, etc., may be suitable for use with a framework.

As an example, a format such as the JSON 3D format (.jd format) may be utilized. The .jd file format is designed to store geometry and animations in an open standard human-readable format and that allows for dynamically loading in a multitude of different engines or frameworks. A .jd file component can be designed to be as lightweight as possible to minimize processing and rendering demands, for example, in Direct3D or WebGL/OpenGL/Vulkan frameworks. Using the JSON format can be practical as it can be more compact than XML, which can allow for less time to load (e.g., download) and hence less latency. As an example, for a given model, it may be exported by a JSON exporter and, if desired, a process may involve editing a .jd file, directly and/or indirectly (e.g., via a text editor, a web app, etc.). A .jd file can include various parts such as, for example: meta, materials, model, hierarchy and animation parts.

As an example, an approach can use a materials array as a collection of JSON material objects where, for example, a material object contains information about colors and texture maps. A model can be an object that contains a mesh array, which may be optimized geometry data meant to be passed into buffers directly. Groups array can be subsets of a mesh where each group contains faces in a mesh which using the same material. A hierarchy can be, for example, an object that contains a nodes array. As an example, a hierarchy object can include a nodes array where each node includes a name, parent and local transformation (position, quaternion, scale). As an example, a node may represent a bone if the model has skinned mesh. As to an animation object, it can specify multiple animation clips where, for example, a clip may contain several tracks such as pos, rot and scl (e.g., position, rotate, scale, etc.). As an example, an animation may have an associated framerate (e.g., frames per second).

As to generating realizations of a geologic environment, as an example, the PETREL framework may be utilized for facies modeling, which can find use for populating geocellular grids with discrete property values for geological characterization of a reservoir, etc. Such an approach allows for seismic-driven modeling in which probabilities can be used in several different ways to help create a realistic representation of the depositional facies or lithologies.

As an example, a library of indicia for various facies or lithologies may be utilized for purposes of data population, rendering with markings, rendering with actual rock images, for example, upon zooming-in. Such a library may be a standard library or a custom library. For example, a standard accepted manner of indicating facies or lithologies using black and white lines may be utilized. As another example, consider a custom library of photographic images of actual facies or lithologies, which may be particular to a geologic region, which may be taken from core imaging, borehole imaging, exposed region imaging, etc. As to properties, where loaded into or otherwise associated with a model of a geologic region, such properties may be utilized for purposes of simulation. For example, consider use of a reservoir simulator that can utilize spatially distributed properties in simulation of fluid flow in a reservoir. While a reservoir simulator is mentioned, one or more other types of simulators may be utilized. For example, consider a geomechanics simulator, a seismic acquisition simulator, a hydraulic fracturing simulator, etc. As explained, a workflow can include interacting with data to build and/or to edit a model where such a model may be suitable for use in a simulator or simulators to generate simulation results. Where the workflow can be expedited through use of a method (e.g., using a system that includes at least some of the features of the system 1000 of FIG. 10), the production of simulation results may be expedited, which may shorten the time demand in moving from exploration to production (e.g., production of hydrocarbons from one or more reservoirs using one or more wells, etc.).

As an example, well log data and point attribute data may be upscaled into one or more geocellular grids. In such an example, properties can be distributed into a remaining 3D grid volume (e.g., via one or more of a variety of algorithms). As an example, one or more structural grids may be utilized to model depositional properties more accurately using a depospace concept.

Seismic surveys can generate datasets of seismic data that can be of sizes that can be relatively large in that they can give rise to data transmission concerns, data file size concerns, etc. For example, a dataset may be in excess of 1 TB. For example, consider a dataset of 10 TB, which may be a 10 TB file. A storage system such as a cloud-based storage system (e.g., cloud platform associated storage system, etc.) may store data of a dataset as a unitary object (e.g., a composite object) where the size of that unitary object is limited. For example, in the GOOGLE CLOUD STORAGE system (GCS), there is a maximum size limit of 5 TB for individual objects. Thus, the 10 TB dataset is not amenable to storage as a unitary individual object. An alternative may be to reconstitute the 10 TB dataset as a non-object dataset file. As an example, a dataset can be stored in a storage system that is not cloud-based and can be transferred from that storage system via one or more networks to a storage system that is cloud-based.

As an example, a dataset of a particular region may be as large as a terabyte, terabytes, a petabyte or petabytes (e.g., $1000^4$ or more). As an example, consider a dataset of the EDGE project, which provides a detailed regional view over the prolific deepwater Central Gulf of Mexico through a combination of seismic acquisition techniques, earth model building, and imaging technologies. The EDGE project includes approximately 50,000 km$^2$ of continuous images, which can be consumable by a framework such as the PETREL framework; however, various limitations can be encountered where such a framework is instantiated in a workstation environment. For example, the dataset may demand splitting into sub-regions as memory and processing resources can be limited. As an example, a system that includes cloud platform resources can provide for accessing a dataset such as the EDGE project dataset with an ability to render visualizations of the Central Gulf of Mexico subsurface. Such an approach can include implementation of a system such as the system shown in FIG. 10.

In the example of FIG. 10, one or more computational resources can operate to generate shapes, which may be, for example, JSON shapes. In JSON, consider the following example code:

As an example, one or more types of converters may be utilized in a system such as the system 1000. For example, consider a converter to JSON format to ESRI Shapefile format (JSON to SHP) and/or vice versa, which may be implemented for individual and/or batch conversions. As an example, a converter may provide for vector and raster GIS/CAD formats and various coordinate reference systems.

As shown in FIG. 10, shapes may be received by a server side rendering service (e.g., a rendering engine, etc.) that can generate a video stream that can be transmitted to the web app of the client device for rendering. As an example, shapes may be specified in an object format. As mentioned, shapes may be generated using data of a data store via a converter

```
/*
  Below is an example shape object in JSON notation. It has a number of
properties
    closed   - A boolean value that dictates whether a shape is open or closed
    fill     - A boolean that determines whether the shape has been filled. NOTE,
a shape is to be closed to be filled.
    weight   - The weight of the shapes outline
    position - A 2d object indicating the x/y position of the shape
  The above is a sort of shape metadata, however to actually draw a shape,
define a path, or outline, for example, using the 'path' property,
    paths    - An Array of Path Segments.
  A Path segment is a section of the overall shape, it can be a line, a move or
a curve, but for the most part, line and curve segments may be used. To
define the type of segment, define its 'order' which can be specified as a
number. Below is a list of orders and their corresponding types;
    0: Move
    1: Line
    2: Cubic Curve
    3: Quadratic Curve
  Once you have specified the type of path segment, define an array of points
used to draw the segment. For simple segments such as move, or line
commands can include 1 point, however for cubic curves 2 points; 1 for the
control and one for the anchor. For Quadratic curves, 3 points; 2 control
points and 1 anchor.
  The sample below defines a filled rectangle; note specifying the shapes as
'closed' will automatically draw a path segment back to the first point.
*/
{
/*
  Filled Rectangle
*/
closed:true,
fill:true,
weight:1,
position:{
  x:100,
  y:100
},
path:[
  {
  order:0,
  points:[{x:0,y:0}]
  },
  {
  order:1,
  points:[{x:100,y:0}]
  },
  {
  order:1,
  points:[{x:100,y:100}]
  },
  {
  order:1,
  points":[{x:0,y:100}]
  }
 ]
}
``` and/or a reader. As an example, a data store, a converter, a reader, etc., may be cloud-implemented using cloud platform resources.

As an example, a system can provide for in situ visualization where such visualization may occur through use of a multi-threaded computation engine (e.g., multiple core processors, etc.). In such an approach, latency may be largely reduced to that approaching input/output equipment (e.g., data interfaces). As an example, a system can provide for effective visualization computation "on the fly", for example, of a tile or a brick or another type of visual element with "real time" performance (e.g., low latency performance). As an example, a cloud platform service can provide for visualizations of one or more earth models, which may be of a size or sizes that may otherwise present various problems that can confound real time performance. For example, as shown in FIG. 10, a system that converts data to shapes or otherwise transmits shapes to a server side service can provide for handling and visualization of data of sizes that may be considered massive, which otherwise would demand one or more massive file exports.

As shown in FIG. 10, one or more converters may operate in a relatively local manner with respect to data stores. For example, consider a data storage server that can implement a converter or servers that can implement converters, which may optionally operate in series and/or in parallel. Such an approach can reduce data transmission demands where, for example, rather than transmitting data from a data store, shapes are transmitted (e.g., as shape objects, etc.). In such an approach, a server side service can generate composite visualizations, which may be multiple resolution composite visualizations, that can be streamed via a network (e.g., the Internet, etc.) to a client device that executes a web app. As mentioned, data in the context of earth modeling, interpretation, etc., can be large (e.g., terabytes), which can confound real time (e.g., low latency) rendering of multidimensional visualizations.

As an example, one or more data stores can be cloud platform hosted data stores, which can utilize cloud resources to perform various operations. For example, consider a geometric engine that executes "live" using cloud platform resources that can access data in one or more data stores. In such an example, shape information can be generated "on the fly" such that a stream can be generated for transmission to a web app (e.g., executing on a client device, etc.). Such an approach can be flexible in that it can operate without overarching visualization specific files generated, with one or more desired resolutions (e.g., which may differ from a data file resolution), and provide for interactive editing of one or more models (e.g., earth models, etc.). As an example, a system can be implemented in a cloud platform where data stores, converters and stream generators utilize cloud-based resources that can respond to commands, events, etc., from a client web app (e.g., as executing on a client device, etc.).

As an example, a scenario can involve visualization of a very large area at a high resolution. In such an example, a rendering engine can provide for zooming in and zooming out on tiles/bricks according to a camera position. Such an approach can result in a visualization of coarse resolution when zoomed out and can provide a visualization that refines automatically with zooming in. As an example, an application can be utilized to focus on a specific area to get a highly detailed rendering, for example, to remedy one or more inconsistencies. For example, an interpretation of seismic data may result in a horizon in one region of the model that is not matched to the same horizon in another region of the model. In such an example, a zoomed out view may provide for visualization and identification of the mis-match while a zoomed in view may provide for localized editing to improve the model.

As an example, a system can include an API or APIs for rendering and backend services. Such an approach can provide a "contract" between rendering and computation services. As an example, via a quadtree/octree layout, a computation service can provide a tile/brick for a given area. As an example, a tile/brick request from a visualization service can be asynchronous and multi-threaded. As an example, tiles/bricks can be provided by a highly parallelized service, for example, to work around the latency of a cloud backend.

As an example, for a seismic processing workflow, a system can provide for visualization of intermediary or partial results, which may provide for assessing quality/validity of a final outcome. As an example, a seismic processing workflow may operate in conjunction with one or more field operations, which can include one or more survey related operations.

As an example, a method can include a user selecting an area on which to focus and at which resolution to look at it. Such an approach can be akin to moving a digital camera closer and taking a new picture.

As an example, a method can include model building, which can be an iterative process. Such a model can include inaccuracies where a user may inspect or otherwise analyze the model to identify one or more inaccuracies. For example, consider a model that is to be "water tight" that includes a leak. In such an example, a user may zoom in on the leak and repair it where a command may be issued responsive to use of an input tool (e.g., a stylus, a mouse, a finger, etc.) and where the visualization may be updated (e.g., re-rendered) with low latency (e.g., in less than a few seconds). Such an approach can expedite a workflow that aims to quality control a model, further build a model, etc. Such an approach may be amenable to rapid iterations and, hence, time saving for a user.

As mentioned, a model may cover a large region of the Earth. For example, the EDGE project dataset covers a region that is extensive with the Central Gulf of Mexico. Such a dataset can be orders of magnitude larger than a dataset maximum of a workstation based computational framework (e.g., one that does not leverage cloud-based resources).

Figure 12:
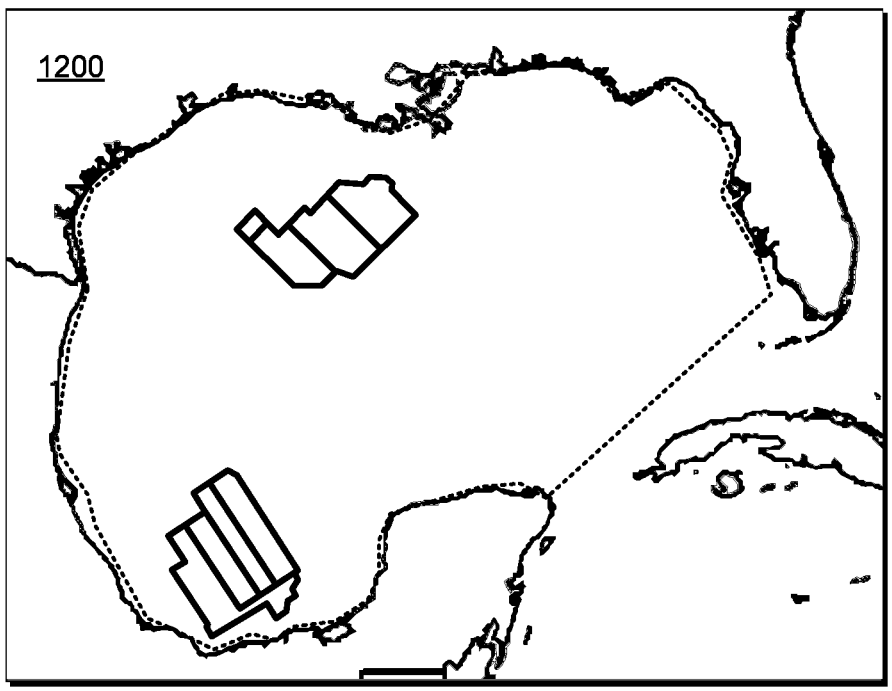
FIG. 12 illustrates an example of a visualization of data and a graphical description of data.
Figure 12:
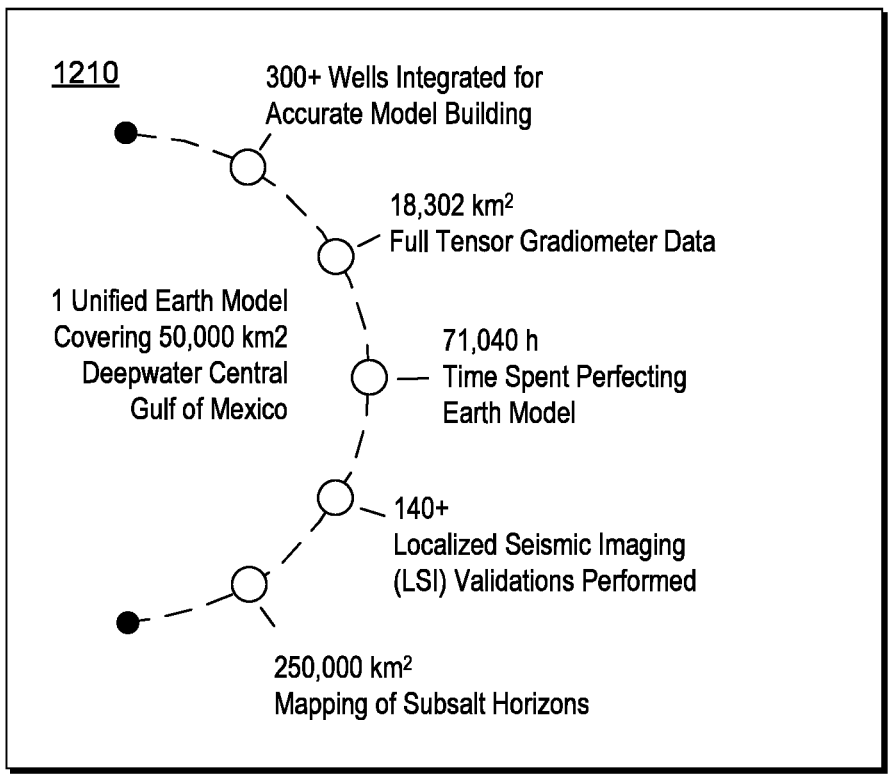

FIG. 12 shows an example of a visualization of the EDGE project dataset as being extensive with the Central Gulf of Mexico, which includes over 200 wells integrated for accurate model building, full tensor gradiometer data, over 140 localized seismic imaging validations, 250,000 $km^2$ of mapping of subsalt horizons, etc. Rather than billions of triangles, a visualization can be based on trillions of triangles (e.g., shapes). Rather than terabytes of properties, a visualization can be based on petabytes of properties. As an example, a large data set may include 10 or more surfaces represented by over one billion triangles (e.g., as shapes, etc.) where properties can be assigned to each of the triangles, which may result in terabytes of data. For example, consider a dataset that includes at least 10 surfaces and at least 8 properties where over a billion triangles represent the surfaces with corresponding property data that exceeds several terabytes.

As to the EDGE project example, a user may desire visualizing less than the highest resolution, which can be that of underlying data. As mentioned, where computational resources are inadequate to handle the EDGE project dataset as a whole, it can demand splitting, such as subdivision into three smaller data sets. Such an approach can make a workflow complicated with additional tasks that are associated with the size of the dataset.

As mentioned, a workflow can include rendering surfaces resulting from seismic interpretations that define zones where, for example, the zones represent closed volumes which can be populated by different properties. For example, consider properties that can be used in seismic processing (e.g., depth migration, etc.).

As mentioned, a user may desire an ability to visualize data using a multi-resolution representation. As an example, a system can provide for large data types, volumes, and surfaces being subdivided into smaller parts, which may be tiles and/or bricks (e.g., 2D, 3D, etc.). As an example, a system can generate a desired level of detail (LOD) that is created by combining data pieces that follow a hierarchical structure such as, for example, a quadtree and/or an octree data structure.

As an example, a method can include adaptive rendering. For example, consider a web app that allows a user to position a camera for an orthographic view, a perspective view, or another type of view. In such an example, according to camera data, which may be transmitted via a network to cloud platform resources, tiles and/or bricks can be loaded, for example, asynchronously. As an example, a method can include a coarse resolution rendering via data of a data stream followed by a refined resolution rendering (e.g., a visualization may be refined with respect to time).

As an example, a system such as the system 1000 of FIG. 10 can handle large data types (e.g., seismic cube, earth model, etc.) where interpretations, analyses, etc., may "stay in the cloud". For example, a web app can execute on a client device where commands, etc., are transmitted to cloud-based resources for performing one or more tasks of a workflow, which may be performed and results thereof stored in the cloud. In such an example, a user may be able to perform workflow tasks while working on a relatively lightweight device that can process a data stream for rendering visualizations. As an example, a data stream can be pixel-based and/or vector-based. For example, a visualization may be rendered to a pixel-image in the cloud and the pixel image may be transmitted to a web app that executes on a client device and/or a visualization may be constructed at least in part from vector graphics where vector graphics information may be transmitted to a web app that executes on a client device. As an example, a web app may provide for rendering a pixel image and/or rendering vector graphics.

Vector graphics can be for rendering defined in terms of points, which can be connected by lines and curves to form polygons and/or other shapes. As an example, a point can have a definite position on an x- and y-axis of a work plane and a direction of a path. As an example, a path may have various properties including values for stroke color, shape, curve, thickness, and fill. Vector graphics may be found in SVG, EPS and PDF graphic file formats. Raster graphics file formats include JPEG, PNG, APNG, GIF, and MPEG4.

As an example, the system 1000 of FIG. 10 can include one or more GPUs (e.g., NVIDIA Corp, Santa Clara, California, etc.). For example, one or more of the servers 1066 can include one or more GPUs. As an example, the system 1000 may utilize one or more shaders. As an example, a shader can calculate rendering effects on graphics hardware with a high degree of flexibility. Various shaders are coded for a graphics processing unit (GPU) or units (GPUs). As an example, a shading language may be used to program a programmable GPU rendering pipeline or, for example, a fixed-function pipeline may be utilized, which performs various geometry transformations and pixel-shading functions. As an example, position, hue, saturation, brightness, and/or contrast of pixels, vertices, and/or textures may be used to construct an image, which may be altered on the fly, for example, using algorithms defined in a shader and/or which may be modified by external variables or textures introduced by a program that calls a shader (e.g., or shaders).

As an example, a system can provide for multi-resolution rendering and multi-threaded IO. For example, consider a rendering engine that can receive multiple inputs and provide multiple outputs. Such a rendering engine may provide for multiple resolution images (e.g., pixel, vector graphic, etc.) that can be streamed to a web app executing on a client device.

Figure 13:
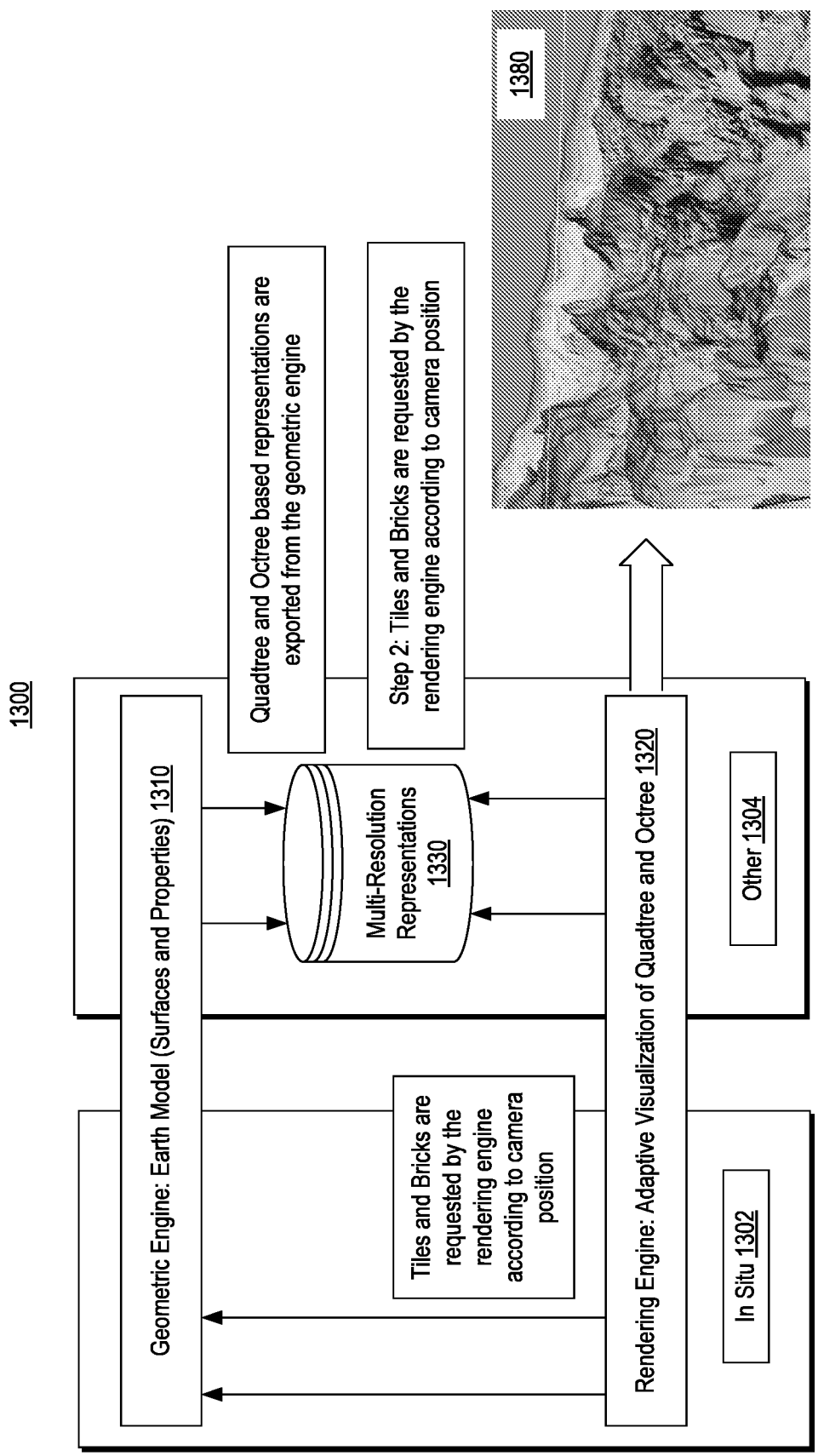
FIG. 13 illustrates an example of a system.

FIG. 13 shows an example of a system 1300 that can be utilized for various visualization tasks. As shown, tasks may include in situ visualization or "on the fly" visualization 1302, which is shown in comparison to another visualization approach 1304. The system 1300 includes a geometric engine 1310 and a rendering engine 1320. The geometric engine 1310 can be responsible for surfaces, volumes, properties, etc., which can be associated with a model such as an earth model. The rendering engine 1320 can be responsible for adaptive visualization tasks, which may be associated with one or more types of hierarchical structures (e.g., quadtree and octree).

As an example, a geometric engine may include or be operatively coupled to one or more data stores (see, e.g., the one or more data stores 1042 and 1044 of the system 1000 of FIG. 10) where the geometric engine can provide for generation of structured shape information. As an example, a rendering engine can provide for generation of a visualization data stream using structured shape information (see, e.g., the rendering block 1076 and the visualization data stream 1080 of the system 1000 of FIG. 10). As an example, a geometric engine and/or a rendering engine can be extensible using one or more provisioning techniques that can provision resources (e.g., cloud platform resources, etc.).

In FIG. 13, the in situ paradigm 1302 and the other paradigm 1304 are illustrated. In both instances, tiles and bricks may be requested by the rendering engine 1320 according to a camera position (e.g., a camera tool that can be controlled using one or more HIDs associated with a client device, etc.). As shown, quadtree and octree based representations can be exported from the geometric engine 1310 and tiles and bricks can be requested by the rendering engine 1320 according to the camera position. As shown, the tiles and bricks as requested can provide for multi-resolution representations per the block 1330. In FIG. 13, an example end user visualization 1380 is presented, which can be streamed from the rendering engine 1320 (see, e.g., the visualization data stream 1080 of FIG. 10).

Figure 14:
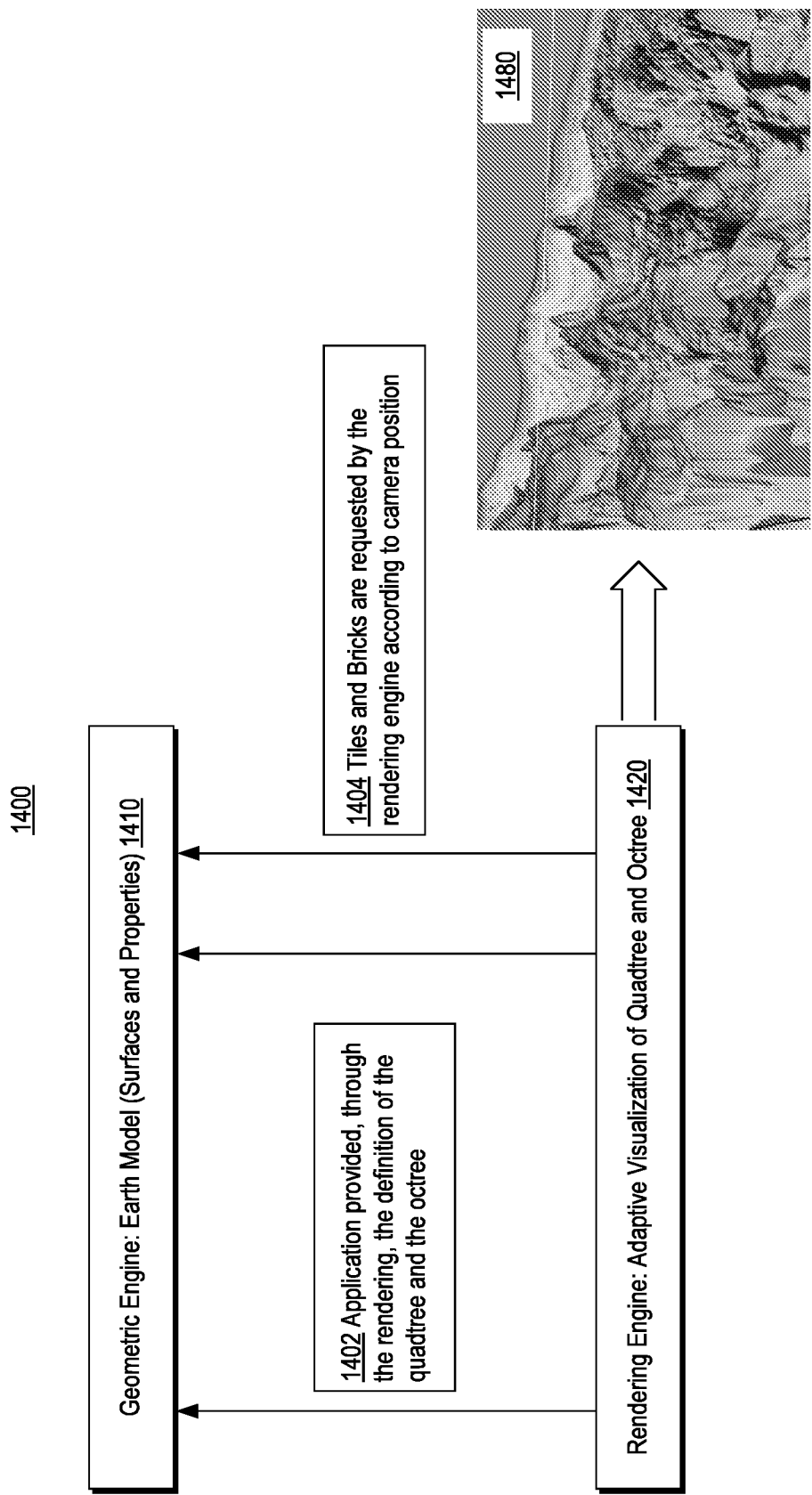
FIG. 14 illustrates an example of a system.

FIG. 14 shows an example of an application driven multi-resolution rendering system 1400 that can operate per a block 1402 for an application provided definition of a quadtree and an octree and per a block 1404 for tiles and bricks requested by a rendering engine according to a camera position (e.g., a camera tool position, view, etc.). As shown, the system 1400 includes a geometric engine 1410 and a rendering engine 1420. The system 1400 may operate according to an in situ paradigm with application defined multi-resolution representations. The system 1400 can be operated such that an application can provide visualizations through rendering using a definition of a quadtree and an octree per the block 1402 where tiles and/or bricks are requested by the rendering engine according to a camera position per the block 1404. In such an example, a multi-resolution representation can be defined by a geometric area that is to be sampled (e.g., a bounding box, etc.) where a resolution can be defined (e.g., maximum number of samples in each direction, etc.) along with a tile size and/or brick size. In FIG. 14, an example end user visualization 1480 is presented, which can be streamed from the rendering engine (see, e.g., the visualization data stream 1080 of FIG. 10).

The in situ or "on the fly" approach 1302 of FIG. 13 can be implemented using cloud platform resources (see, e.g., the system 1000 of FIG. 10), which can allow for provisioning of adequate processing power, a multi-threaded computation engine, etc. Such an approach may reduce latency to that approaching IO operations. An "on the fly" approach to rendering a tile or a brick may aim to achieve latency that is less than one second (e.g., optionally less than 500 ms). As to the adaptive multi-resolution approach (AMRA) of FIG. 14, as implemented using cloud platform resources, it can enable models with a size beyond the limit of a workstation approach. The AMRA can provide flexibility for various types of workflow scenarios, which can include visualizing a very large area at very high resolution where a rendering engine can provide for zoom in and out with the tiles/bricks according to a camera position. When zoomed out, a rendering engine may provide a visualization of coarse resolution and when zooming in, a rendering engine can provide a visualization that can refine with respect to time of zooming in (e.g., akin to a GOOGLE MAPS/GOOGLE EARTH type of user experience).

As to the GOOGLE EARTH application, an application programming interface (API) is available and usable with JAVASCRIPT. For example, consider the following code:

```
// Instantiate an image with the Image constructor.
var image = ee.Image('CGIAR/SRTM90_V4');
// Zoom to a location.
Map.setCenter(-111, 3, 9);
// Display the image on the map.
Map.addLayer(image)
```

As explained, a method can include accessing data, which can include various types of data associated with one or more frameworks. For example, PETREL framework data can include objects that represent various types of items, which can include horizon objects, well objects, log objects, etc. In such an example, a converter can access such objects and convert the objects to structured shape information. For example, a well object may be converted into a line that is specified by points or into a series of line segments into a series of points. In such an example, the well data may be represented with respect to a tile, tiles, a brick, bricks, etc., which may be structured in a hierarchy. As mentioned, a web app may provide for editing of data. For example, consider editing a well trajectory via dragging a point where the dragged point may result in updating data, which can provide for updating the well object in the associated framework (e.g., PETREL framework, etc.). Such an update may be performed using computational resources of a cloud platform. In such an example, a user may edit data without having data loaded locally (e.g., on a client device). As an example, where an object includes properties, which can be for data (e.g., log data, etc.), a user may be able to edit such properties using a web app to interact with cloud platforms.

As mentioned, a web app can execute on a client device where, for example, a user may be performing a workflow such as, for example, quality controlling a model where such a workflow can include focusing in on a specific area of the model to get highly detailed rendering to remedy some of the model inconsistencies (e.g., via editing, etc.). In such an example, edits may be effectuated via user input received by the client device and transmitted to a computation framework that can execute using cloud-based resources (see, e.g., FIG. 8, FIG. 9, FIG. 10, etc.). In such an example, the user may experience a near real time response to an edit whereby a visualization can be updated responsive to an edit. Such an approach can reduce time, allow for more quality control tasks, etc., which can help to improve a model such as an earth model. As mentioned, such an approach can allow for a relatively large model to be reviewed where visualizations can be via a tile and/or brick hierarchy.

As an example, various equipment can be utilized as in gaming (e.g., computer games or gaming applications); noting that data sizes and workflows for oil and gas industry practices can involve data that may lack certain and datasets that can be an order of magnitude larger or more than those of computer games. As to lack of certainty, it can demand user edits, user interpretation, etc. As mentioned, an earth model may be edited due to one or more inaccuracies. As mentioned, a dataset can be large can cover an expansive region (e.g., the Central Gulf of Mexico). In various workflows, multiple resolution capabilities can be demanded where, for example, various geologic features, properties, etc., may be at various resolutions with respect to underlying data. As an example, a multi-resolution approach can provide for viewing at resolutions that can be less than that of underlying data while providing for zooming in to resolutions that can be that of underlying data.

As an example, a visualization system may be operatively coupled to one or more simulators that may utilize an earth model (e.g., a reservoir model, etc.). In such an example, data from a simulator may be generated and accessed to generate structured shape information that is suitable for selection and transmission for rendering a visualization or visualizations on a display operatively coupled to a client device. In such an example, a real time approach to simulation results visualization may be implemented. In such an example, a simulator may be implemented using cloud platform resources, which may include an ability to trigger one or more other resources, for example, to cause transmission of visualization data via a network to a client device, etc. As an example, simulation data may be of differing resolution and displayable at various resolutions.

As mentioned, an in situ approach can be "on the fly", where information for visualization can be generated by a geometric engine running "live" in the cloud, for example, using parallel processing. Such an approach can in an on-demand manner generate appropriate structured shape information from various data, which can include data formatted for one or more computational frameworks (e.g., PETREL, etc.). Through parallelization of computations, performance can be reduced towards latency of IO operations. As an example, latency may be less than a few seconds, less than a second or less than 500 ms. As an example, a latency less than 250 ms may be relatively unnoticeable to a user in a workflow involving model editing, seismic data processing, seismic interpretation, etc. As an example, a system can operate without generating a global file for each visualization; rather, particular structured shape information can be generated, which may be on-demand and streamed as appropriate. Various approaches can provide for intermediate visualization of QC measures, which may help to ensure quality/validity of a final result (e.g., a final model, a final seismic process, a final interpretation, etc.).

Figure 15:
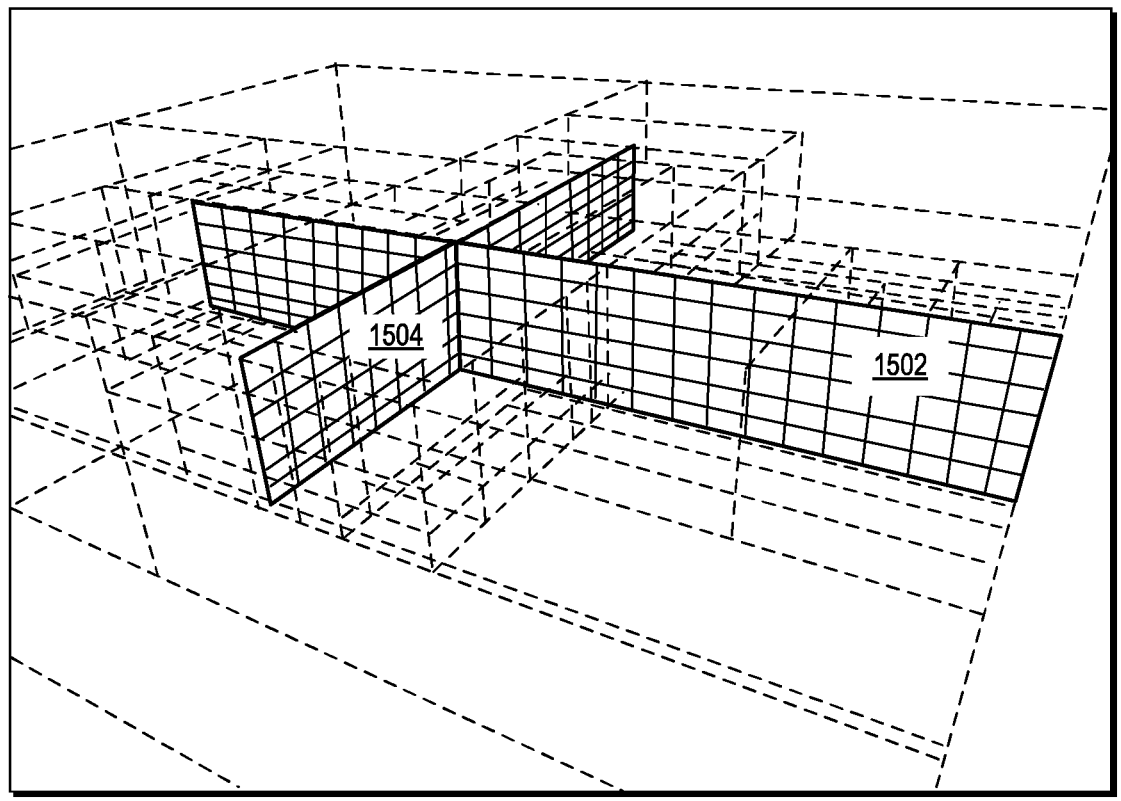
FIG. 15 illustrates an example of a visualization that includes tiles.

FIG. 15 shows an example of an approximate visualization 1500 of a velocity cube (e.g., material seismic velocity, etc.) where various outlines of tiles are illustrated along two intersecting slices 1502 and 1504 of the velocity cube. As explained, a 3D data set can be defined using tiles, which may be organized in a hierarchical structure (e.g., tree structure) where a rendering engine can operate to stream information for various tiles for rendering to a display. As explained, an approach can include pixel-based image streaming and/or vector graphics-based image streaming. In the example of FIG. 15, the visualization 1500 can be part of a graphical user interface (GUI) where a camera (e.g., a camera tool) can be positioned that upon positioning transmits information to a cloud-based system to cause transmission of updated image information.

Figure 16:
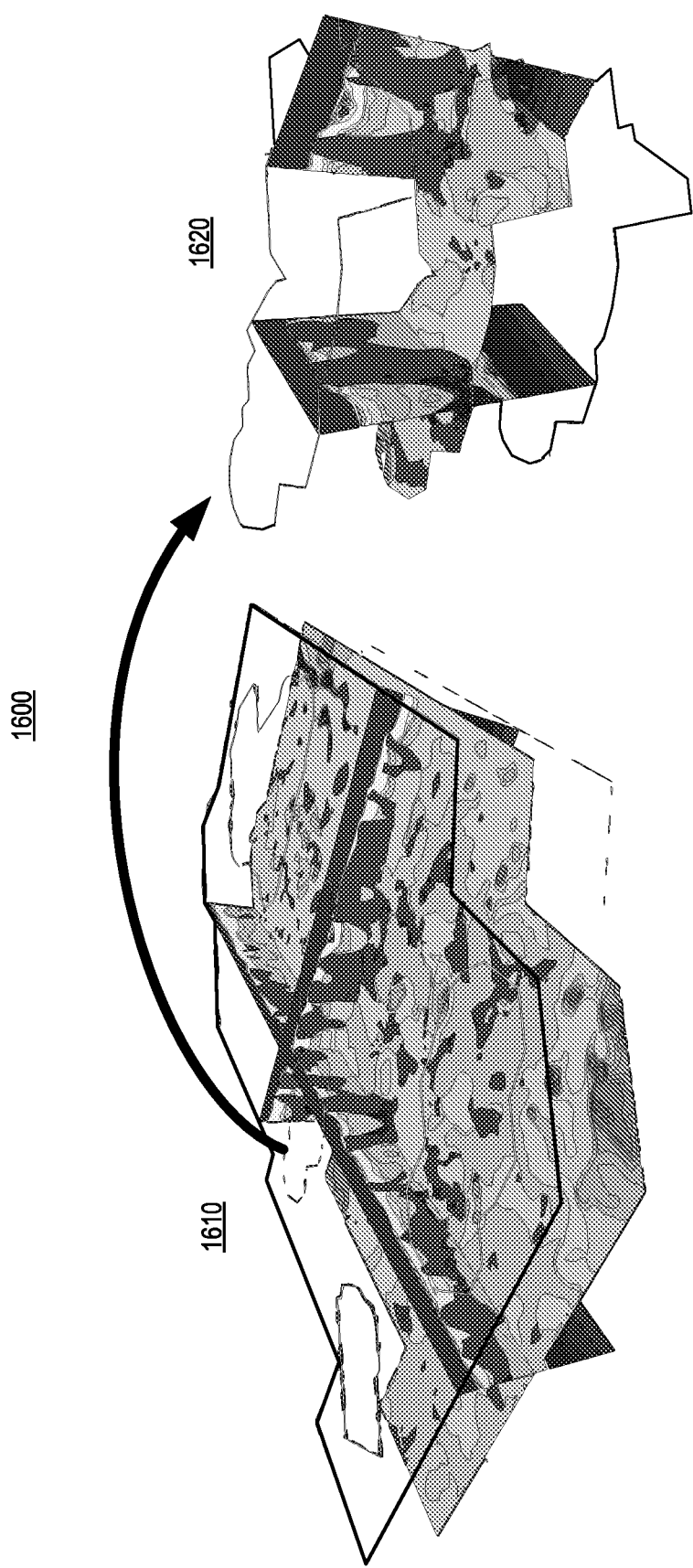
FIG. 16 illustrates examples of visualizations.

FIG. 16 shows an example of a visualization 1600 at two different scales where the image on the right is a zoomed in portion of the image on the left, where upon zooming in, the resolution is increased. The visualization or a portion thereof may be a GUI that is controllable via one or more zoom commands that cause transmission of information to a cloud-based system to cause transmission of updated image information (e.g., zoomed in, zoomed out, etc.).

Figure 17:
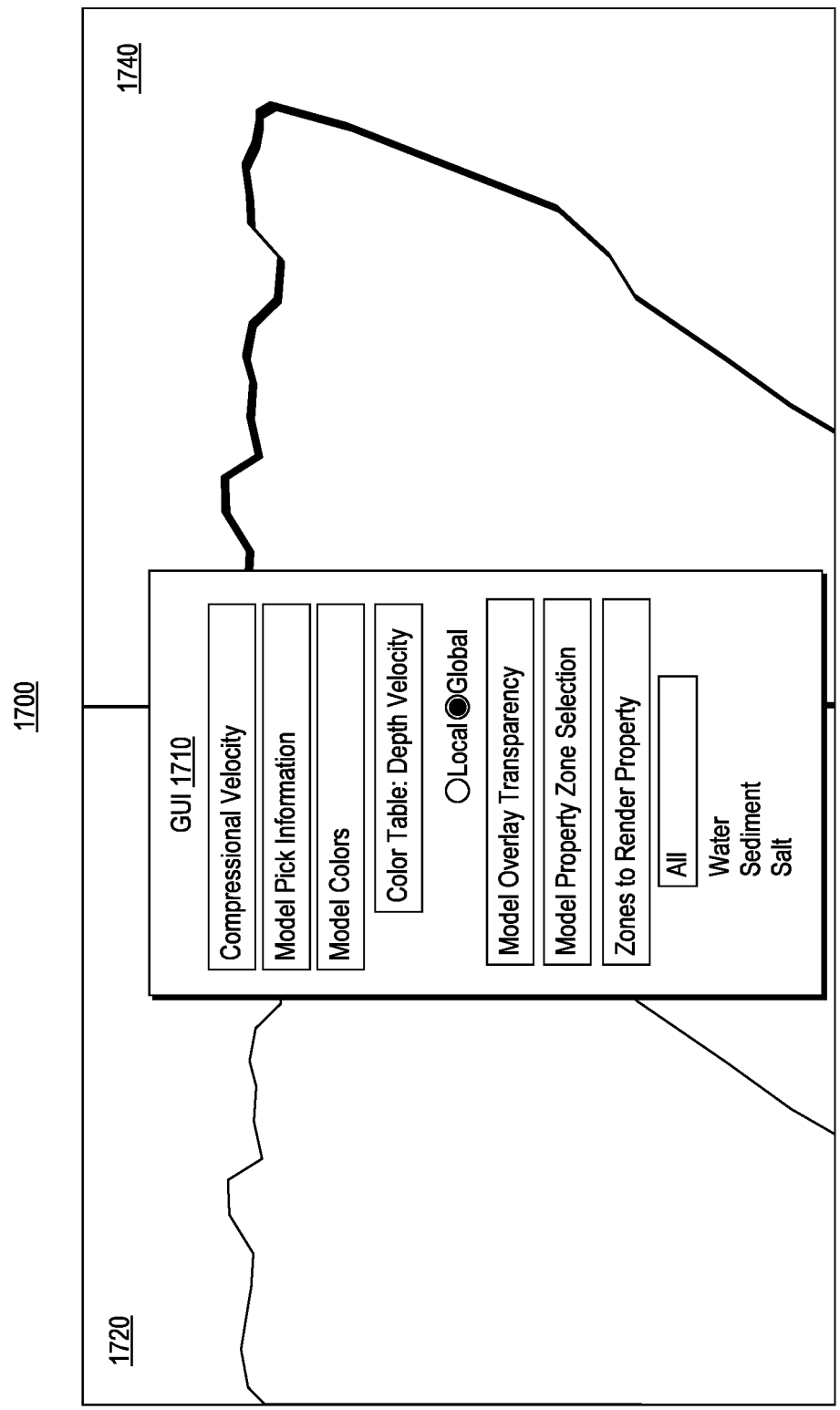
FIG. 17 illustrates examples of visualizations and an example of a graphical user interface.

FIG. 17 shows an example of a visualization 1700 that corresponds to a model editing workflow. In the example, a user can edit a model via a GUI 1710, etc., where upon editing, one or more commands may be transmitted to a cloud-based system that causes transmission of updated image information for the model (e.g., a visualization of the model as edited, etc.). For example, consider the rendered visualization 1720 as being an existing rendering and the rendered visualization 1740 as being received responsive to one or more interactions with the GUI 1710. As an example, the GUI 1710 may be rendered to a client device such as the client device 1010 of FIG. 10. As to editing, it may be responsive to a quality control assessment. For example, a model may exhibit some amount of leakage (e.g., not being watertight, etc.) where a user may interact with a GUI to readily visualize and edit the model.

Figure 18:
FIG. 18 illustrates an example of a visualization.

FIG. 18 shows an example of a visualization 1800 that includes various subsurface features and wells. The visualization 1800 can include approximately two billion triangles and approximately 5 terabytes of property information. Such a visualization may be part of a GUI. The visualization 1800 may be part of the EDGE dataset as explained with respect to FIG. 12. For example, consider the data blocks that are closer to the State of Louisiana, in the more northern portion of the Gulf of Mexico.

Figure 19:
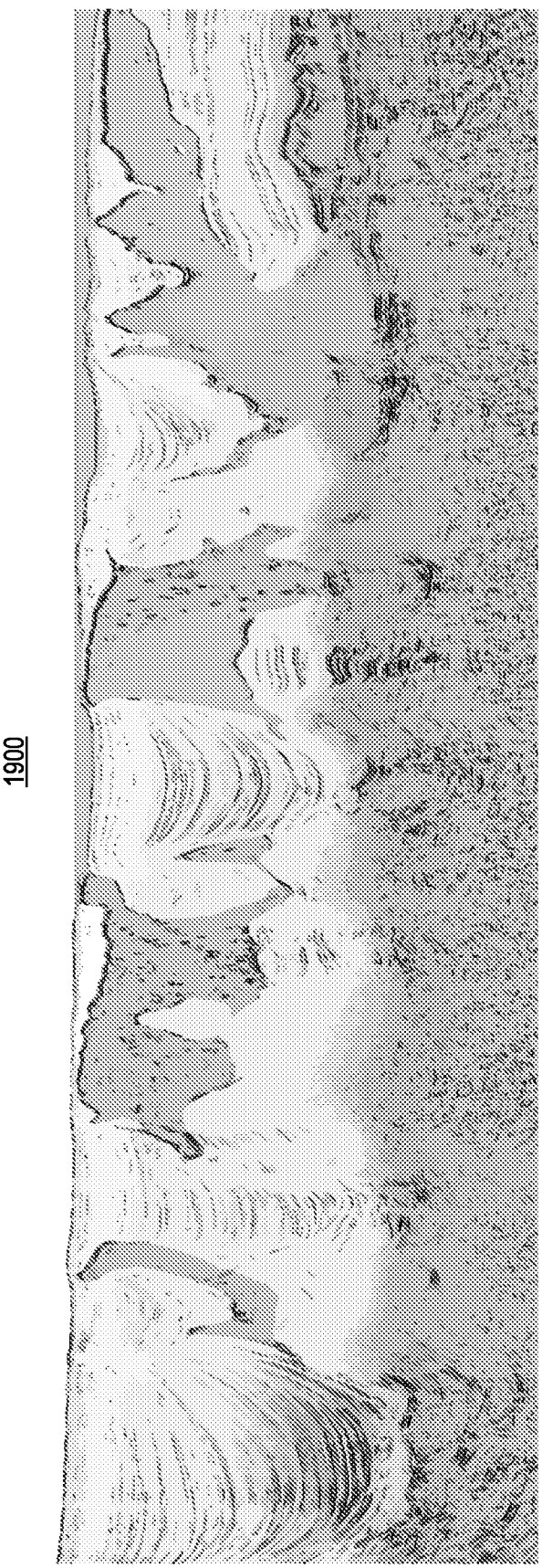
FIG. 19 illustrates an example of a visualization.

FIG. 19 shows an example of a visualization 1900 that can be generated through tiles. For example, consider the tiles of the visualization 1500. For example, a GUI can allow a user to zoom in on the visualization 1500 and cause selection of various tiles that can be utilized to render the visualization 1900.

Figure 20:
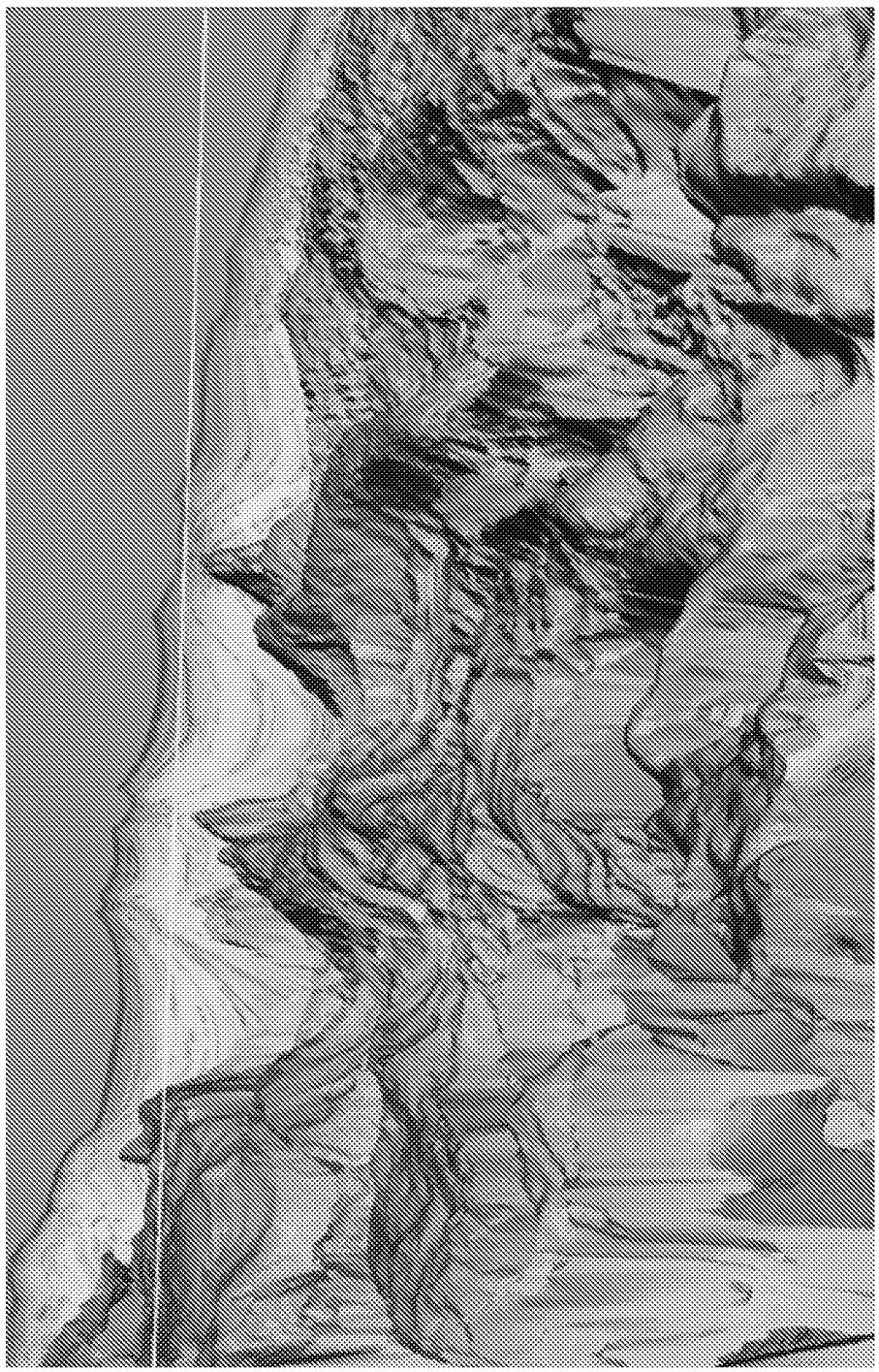
FIG. 20 illustrates an example of a visualization.

FIG. 20 shows an example of a visualization 2000 that can be generated using a system such as the system 1000 of FIG. 10. The visualization 2000 includes various property information, which can help to characterize a subsurface region.

Figure 21:
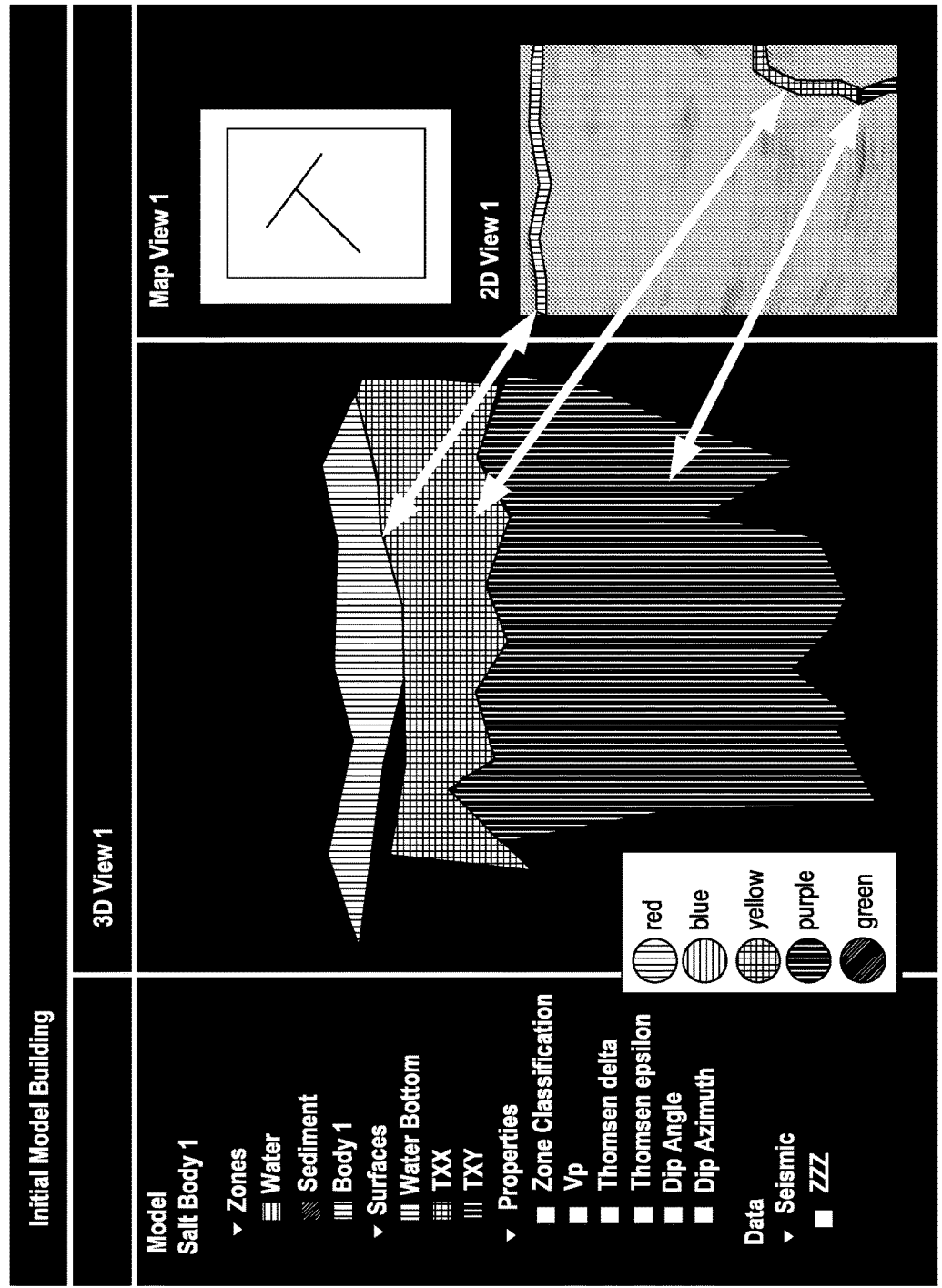
FIG. 21 illustrates an example of a graphical user interface that includes visualizations.

FIG. 21 shows an example of a GUI 2100 that includes various model building features. As shown, a workflow may involve building a model, rendering a view of the model, rendering a view of seismic data, etc. As an example, the 3D view panel of the GUI 2100 may utilize a system such as the system 1000 of FIG. 10.

In the example of FIG. 21, some examples of colors are indicated, which can include indications as color linings per former 37 CFR 2.52(e), which is referenced in the Federal Register, Vol. 64, No. 173, Wednesday, Sep. 8, 1999, where red or pink are represented using vertical black lines on white ground, blue is represented using horizontal black lines on white ground, violet or purple are represented using vertical brick pattern white lines on black ground, yellow or gold are represented using horizontal hatch (crossed) black lines on white ground, green is represented as diagonal lines, etc. In the example GUI 2100, various colors may be rendered according to one or more parameter settings, which may correspond to parameters of an object, objects, etc., of one or more applications. In various other visualizations, colors may be rendered.

In the example GUI 2100 of FIG. 21, a 3D window is shown that includes various colored renderings of structural subsurface structures, including a water bottom and materials TXX and TXY, which may be associated with salt. While particular specific properties are shown in the example of FIG. 21 (e.g., Vp, Thomsen, dip, etc.), these can depend on a workflow being performed, computational framework(s) being utilized, etc. As shown in the example of FIG. 21, the GUI 2100 can include various selectable items that are to be rendered where rendering can be performed according to a template.

As shown in FIG. 21, the various windows include various types of windows of at least one computational framework. A GUI can include a plurality of windows where such windows are arranged and/or controlled according to a template. For example, windows can be arranged and/or controlled according to a template created using a windows builder panel of a framework that can generate and save specifications for how windows are to be rendered (e.g., arranged, styled, etc.).

In the example of FIG. 21, the GUI 2100 includes a map window and a 2D window, which are positioned with respect to the 3D window. As shown, a comparison may be readily made between the picked "horizons" in the seismic data as rendered in the 2D window and the rendered 3D structures in the 3D window as common colors are utilized. The water bottom is shown in red while other structural features are in yellow and magenta. A user may confirm further using a map and location(s) rendered in the map view, which may pertain to a particular "slice" of a seismic data cube that corresponds to the rendering in the 2D window.

As an example, the GUI 2100 may be part of a quality control process that aims to assess quality of an interpretation of a seismic dataset and/or an earth model (e.g., a model built using at least a portion of the seismic dataset). In such an example, where issues may exist, an interpretation process and/or an earth model building process may be re-performed, which may take some amount of time. Where a system such as, for example, the system 1000 of FIG. 10 is utilized, time to address one or more quality-related issues may be expedited. For example, consider a region that includes a horizon that may be spatially relabeled where a user can cause a client device to zoom-in on the region through use of cloud platform resources and make an adjustment to the horizon, which may be part of an earth model (e.g., a structural model, a simulation model, etc.).

As an example, a computational framework can execute remotely such as in a cloud environment (e.g., cloud-based resources of a cloud platform, etc.) where the computational framework includes various tools that can control views. For example, consider a camera icon of a view tool that can be rendered with a view of a model, data, etc., where the camera icon can be adjusted to cause the view tool to alter the view being rendered to be from a particular perspective. Such a tool may include features such as one or more of zoom, pan, rotate, fly-through, etc. As an example, a computational framework may generate a view and then transmit the view via a network.

Figure 22:
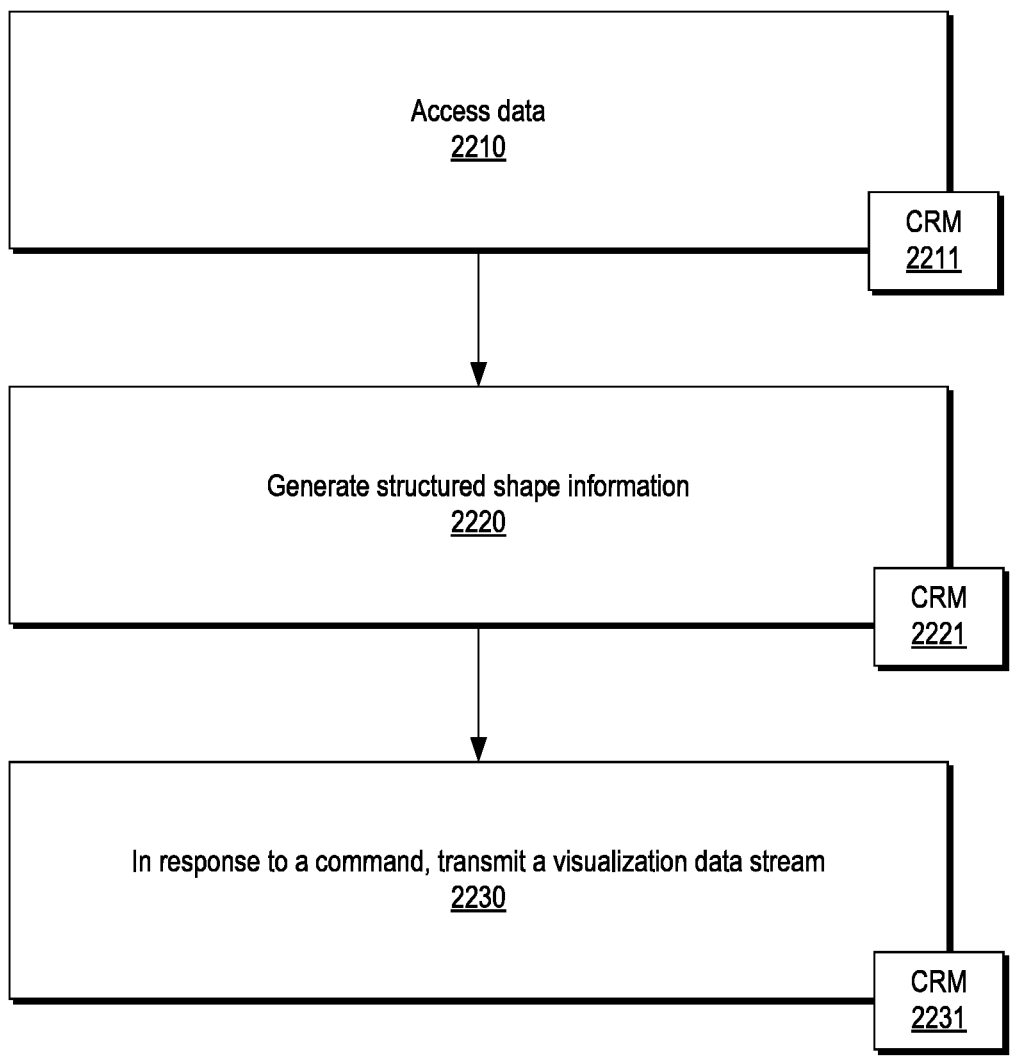
FIG. 22 illustrates an example of a method.

FIG. 22 shows an example of a method 2200 that can include an access block 2210 for accessing data, a generation block 2220 for generating structured shape information using the data, and a transmission block 2230 that, responsive to receipt of an command, provides for transmitting a visualization data stream (e.g., using at least a portion of the structured shape information).

As an example, the method 2200 can include, per the access block 2210, accessing volumetric data from a data store, where the volumetric data correspond to a region; per the generation block 2220, generating structured shape information for the region using at least a portion of the volumetric data; and, per the transmission block 2230, in response to a command from a client device, transmitting to the client device, via a network interface, a visualization data stream generated using at least a portion of the structured shape information. For example, consider the system 1000 of FIG. 10 where remote resources in a cloud platform or cloud platforms can include a geometric engine and a rendering engine where the geometric engine can generate structured shape information and where the rendering engine can generate a visualization data stream using at least a portion of the structured shape information.

As shown, the method 2200 may be implemented in part via one or more computer-readable storage media (CRM) blocks 2211, 2221, and 2231. Such CRM blocks include instructions executable by a processor to instruct a device such as a computing device, a computing system, a controller, etc. A computer-readable storage medium or media (CRM) is or are a non-transitory medium or media that is or are not a carrier wave and not a signal. As an example, the instructions 270 of the system 250 of FIG. 2 can include instructions as in one or more of the CRM blocks 2211, 2221, and 2231.

As an example, a method can include accessing volumetric data from a data store, where the volumetric data correspond to a region; generating structured shape information for the region using at least a portion of the volumetric data; and, in response to a command from a client device, transmitting to the client device, via a network interface, a visualization data stream generated using at least a portion of the structured shape information. In such an example, the structured shape information can include shape information structured according to a tree structure. As an example, structured shape information can include shape information structured according to tiles, bricks or tiles and bricks (e.g., multi-dimensional structures, etc.).

As an example, a method can include accessing volumetric data that includes volumetric data of a geologic model, volumetric data of a seismic survey, or volumetric data of a geological model and volumetric data of a seismic survey.

As an example, a command can be a web app command issued by a client device to a cloud platform.

As an example, a method can include receiving a command to alter at least a portion of volumetric data to generate altered volumetric data. In such an example, the method can include generating altered structured shape information using the altered volumetric data and transmitting a visualization data stream generated using at least a portion of the altered structured shape information.

As an example, transmitting can include streaming such as, for example, streaming of visualization data that can be received and rendered to a display (e.g., where rendering may occur during reception, etc.).

As an example, a method can include generating structured shape information by implementing a converter that generates shape objects.

As an example, a method can include generating structured shape information by implementing a converter that generates JSON formatted shape information.

As an example, structured shape information can include shape information corresponding to a set of primitive shapes.

As an example, a method can include receiving a zoom command and, responsive to the zoom command, transmitting a visualization data stream using a portion of structured shape information at a particular resolution that corresponds to the zoom command (e.g., a zoom-in or a zoom-out).

As an example, a method can include generating a visualization data stream using at least a portion of the structured shape information at multiple resolutions.

As an example, a method can include generating structured shape information by implementing a geometric engine service and transmitting a visualization data stream by implementing a rendering engine service. In such an example, the geometric engine service may process earth model surfaces and properties and the rendering engine service may perform adaptive visualization of the earth model surfaces and properties using one or more tree structures.

As an example, a command can be a camera position related command that specifies at least a view position. For example, consider a camera tool that can be rendered to a GUI and interacted with via one or more HIDs.

As an example, a system can include a processor; memory operatively coupled to the processor; and processor-executable instructions stored in the memory to instruct the system to: access volumetric data from a data store, where the volumetric data correspond to a region; generate structured shape information for the region using at least a portion of the volumetric data; and, in response to a command from a client device, transmitting to the client device, via a network interface, a visualization data stream generated using at least a portion of the structured shape information.

As an example, one or more computer-readable storage media can include computer-executable instructions executable to instruct a computing system to: access volumetric data from a data store, where the volumetric data correspond to a region; generate structured shape information for the region using at least a portion of the volumetric data; and, in response to a command from a client device, transmitting to the client device, via a network interface, a visualization data stream generated using at least a portion of the structured shape information. As an example, a computer program product can include such computer-executable instructions, which can include additional instructions, for example, to perform one or more methods, etc.

As an example, structured shape information can include shape information structured according to tiles and/or shape information structured according to bricks. As an example, a seismic slice can be specified using shape information where representations as to seismic data values, seismic attribute data values, etc., can be represented as tiles that can be utilized to "fill-in" the seismic slice in a visualization of the seismic slice. In such an example, resources in a cloud platform can, responsive to receipt of a command from a client device, transmit visualization data for rendering of the seismic slice at an appropriate resolution using various tiles, which may be, for example, later refined from coarse tiles to finer tiles, etc.

As an example, a method can include accessing volumetric data of a geologic model, accessing volumetric data of a seismic survey, etc.

As an example, a command can be a web app (e.g., web application, web browser application, etc.) command issued by a client device to a cloud platform.

As an example, a method can include receiving a zoom command and, responsive to the zoom command, transmitting a portion of structured shape information at a different resolution than a current resolution. For example, upon zooming in, resolution can be increased and, upon zooming out, resolution can be decreased. As an example, a workflow can include zooming as part of quality control, for example, to edit a model (e.g., structurally, as to properties, etc.). As an example, a model can be a grid-based model (e.g., mesh-based model), which may be defined by geometric elements. As an example, a model may be a reservoir model suitable for simulating physical phenomena such as fluid flow. As an example, a system may be operatively coupled to one or more simulators where simulation results may be data that can be structured as structured shape information and transmitted for visualization (e.g., via rendering to a display, etc.).

As an example, a command can be a camera position related command that specifies at least a view position. For example, where a user adjusts a camera graphic control (e.g., a camera tool) using a web app on a client device, a command may be issued via a network to a cloud platform to cause transmission of information to render a visualization to a display operatively coupled to the client device.

As an example, one or more methods may implement one or more application programming interfaces (APIs). As an example, consider an API that causes a rendering engine to select particular tiles, bricks, etc., according to one or more hierarchical structures. Such an approach may utilize a position or positions to determine which tiles, bricks, etc., to select. Such an approach may include selecting to provide a particular resolution of an image to be rendered to a display via transmitted information, which may be pixel-based and/or vector graphics-based. As an example, a visualization data stream can include one or more data structures that include tile information, brick information, etc., where rendering can occur on a client device to render such tile information, brick information, etc., to a display. For example, consider rendering a seismic slice using tile information, which may be included in a visualization data stream generated in response to receipt of a command by a cloud platform as issued by the client device.

Figure 23:
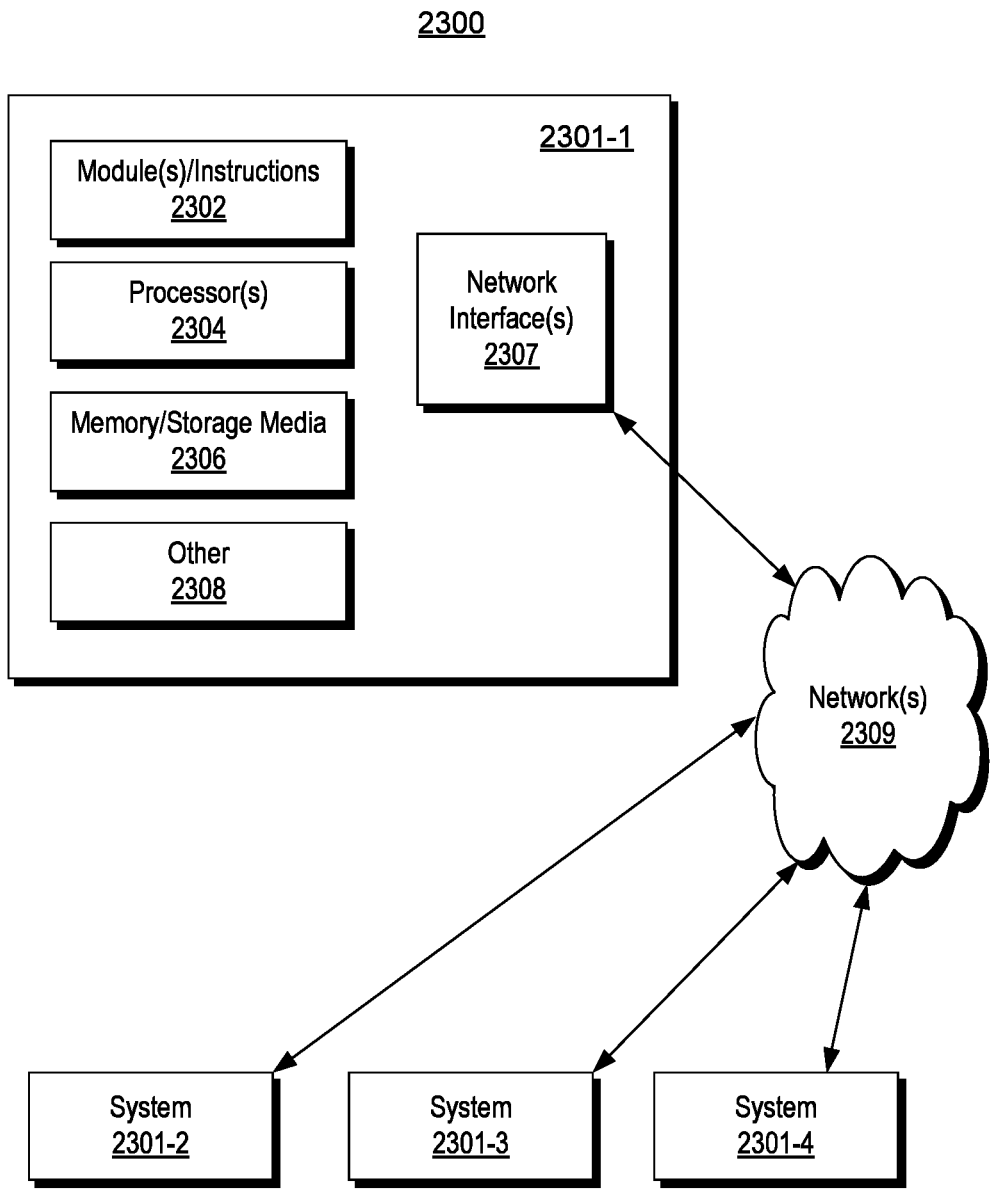
FIG. 23 illustrates examples of equipment.

Embodiments of the disclosure may also include one or more systems for implementing one or more embodiments. FIG. 23 illustrates a schematic view of a computing or processor system 2300, according to an embodiment. The processor system 2300 may include one or more processors 2302 of varying core configurations (including multiple cores) and clock frequencies. The one or more processors 2302 may be operable to execute instructions, apply logic, etc. It will be appreciated that these functions may be provided by multiple processors or multiple cores on a single chip operating in parallel and/or communicably linked together. In at least one embodiment, the one or more processors 2302 may be or include one or more GPUs.

The processor system 2300 may also include a memory system, which may be or include one or more memory devices and/or computer-readable media 2304 of varying physical dimensions, accessibility, storage capacities, etc. such as flash drives, hard drives, disks, random access memory, etc., for storing data, such as images, files, and program instructions for execution by the processor 2302. In an embodiment, the computer-readable media 2304 may store instructions that, when executed by the processor 2302, are configured to cause the processor system 2300 to perform operations. For example, execution of such instructions may cause the processor system 2300 to implement one or more portions and/or embodiments of the method(s) described above.

The processor system 2300 may also include one or more network interfaces 2306. The network interfaces 2306 may include hardware, applications, and/or other software. Accordingly, the network interfaces 2306 may include Ethernet adapters, wireless transceivers, PCI interfaces, and/or serial network components, for communicating over wired or wireless media using protocols, such as Ethernet, wireless Ethernet, etc.

As an example, the processor system 2300 may be a mobile device that includes one or more network interfaces for communication of information. For example, a mobile device may include a wireless network interface (e.g., operable via one or more IEEE 802.11 protocols, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 2300 may further include one or more peripheral interfaces 2308, for communication with a display, projector, keyboards, mice, touchpads, sensors, other types of input and/or output peripherals, and/or the like. In some implementations, the components of processor system 2300 are not necessarily enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 2304 may be physically or logically arranged or configured to store data on one or more storage devices 2310. The storage device 2310 may include one or more file systems or databases in a suitable format. The storage device 2310 may also include one or more software programs 2312, which may contain interpretable or executable instructions for performing one or more of the disclosed processes. When requested by the processor 2302, one or more of the software programs 2312, or a portion thereof, may be loaded from the storage devices 2310 to the memory devices 2304 for execution by the processor 2302.

The processor system 2300 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 2300 may be used to execute programs according to instructions received from another program or from another processor system altogether. Similarly, commands may be received, executed, and their output returned entirely within the processing and/or memory of the processor system 2300.

As an example, one or more computer-readable storage media can include computer-executable instructions executable to instruct a computing system to perform one or more methods or portions thereof described herein.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2 (e.g., processor-executable instructions, etc.).

Figure 24:
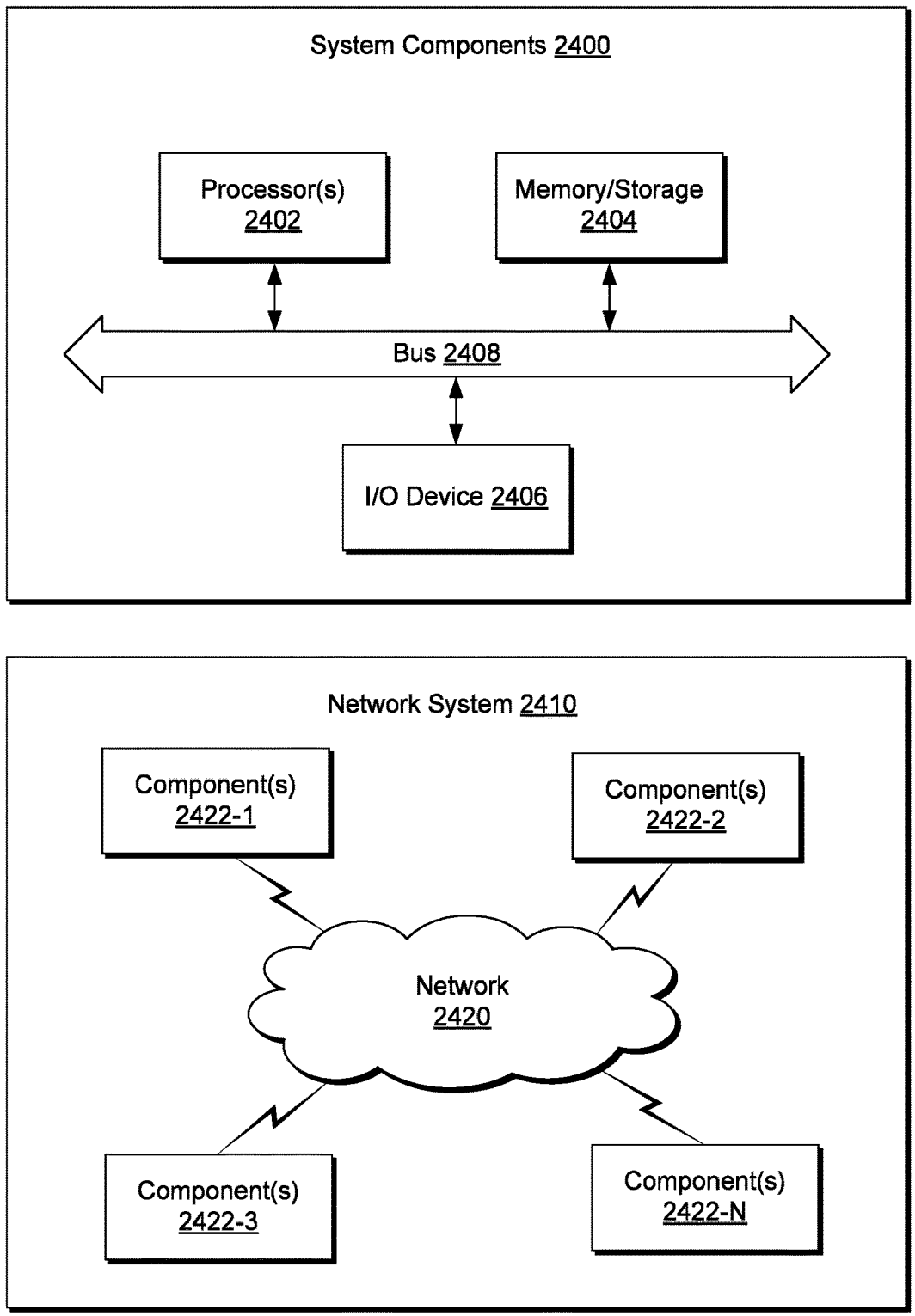
FIG. 24 illustrates example components of a system and a networked system.

FIG. 24 shows components of an example of a computing system 2400 and an example of a networked system 2410. The system 2400 includes one or more processors 2402, memory and/or storage components 2404, one or more input and/or output devices 2406 and a bus 2408. In an example embodiment, instructions may be stored in one or more computer-readable media (e.g., memory/storage components 2404). Such instructions may be read by one or more processors (e.g., the processor(s) 2402) via a communication bus (e.g., the bus 2408), which may be wired or wireless. The one or more processors may execute such instructions to implement (wholly or in part) one or more attributes (e.g., as part of a method). A user may view output from and interact with a process via an I/O device (e.g., the device 2406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2410, which includes a network 2420, which may be a network of networks. As shown, the network system 2410 includes components 2422-1, 2422-2, 2422-3, . . . 2422-N. For example, the components 2422-1 may include the processor(s) 2402 while the component(s) 2422-3 may include memory accessible by the processor(s) 2402. Further, the component(s) 2402-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
accessing volumetric data from a data store, wherein the volumetric data correspond to a region;
generating structured shape information for the region using at least a portion of the volumetric data, wherein the structured shape information is generated utilizing both a hierarchical structure of the volumetric data and a streamable shape specification comprising one or more types of shapes, wherein the one or more types of shapes are associated with a model of a portion of Earth; and
in response to a command from a client device, transmitting to the client device, via a network interface, a visualization data stream generated using at least a portion of the structured shape information for rendering of a visualization, wherein, during the transmitting, the visualization data stream progresses according to the hierarchical structure to increase a level of detail of the visualization with respect to time.

2. The method of claim 1 wherein the hierarchical structure comprises an octree structure.

3. The method of claim 1 wherein the hierarchical structure comprises tiles.

4. The method of claim 1 wherein the hierarchical structure comprises bricks.

5. The method of claim 1 wherein the accessing volumetric data comprises accessing volumetric data of a geologic model.

6. The method of claim 1 wherein the accessing volumetric data comprises accessing volumetric data of a seismic survey.

7. The method of claim 1 wherein the command comprises a web app command issued by the client device to a cloud platform.

8. The method of claim 1 further comprising receiving, from the client device, a command to alter at least a portion of the volumetric data to generate altered volumetric data.

9. The method of claim 8 further comprising, responsive to receipt of the command to alter, generating altered structured shape information using the altered volumetric data and transmitting to the client device another visualization data stream generated using at least a portion of the altered structured shape information.

10. The method of claim 1 wherein the transmitting comprises streaming.

11. The method of claim 1 wherein the generating comprises implementing a converter that generates shape objects according to the streamable shape specification.

12. The method of claim 1 wherein the generating comprises implementing a converter that generates JSON formatted shape information according to the streamable shape specification.

13. The method of claim 1 wherein the structured shape information comprises shape information corresponding to a set of primitive shapes, wherein the set of primitive shapes comprises at least triangles.

14. The method of claim 1 further comprising receiving a zoom command and, responsive to the zoom command, transmitting another visualization data stream using a portion of structured shape information at a particular resolution that corresponds to the zoom command.

15. The method of claim 1 further comprising generating the visualization data stream using at least a portion of the structured shape information at multiple resolutions.

16. The method of claim 1 wherein the generating comprises implementing a geometric engine service and wherein the transmitting comprises implementing a rendering engine service.

17. The method of claim 16 wherein the geometric engine service processes earth model surfaces and properties and wherein the rendering engine service performs adaptive visualization of the earth model surfaces and properties using one or more tree structures of the hierarchical structure.

18. The method of claim 1 wherein the command comprises a camera position related command that specifies at least a view position in a three-dimensional coordinate space of the region for multi-threaded, asynchronous generation of the structured shape information.

19. A system comprising:
a processor;
memory operatively coupled to the processor; and
processor-executable instructions stored in the memory to instruct the system to:
 access volumetric data from a data store, wherein the volumetric data correspond to a region;
 generate structured shape information for the region using at least a portion of the volumetric data, wherein the structured shape information is generated utilizing both a hierarchical structure of the volumetric data and a streamable shape specification comprising one or more types of shapes, wherein the one or more types of shapes are associated with a model of a portion of Earth; and
 in response to a command from a client device, transmit to the client device, via a network interface, a visualization data stream generated using at least a portion of the structured shape information for rendering of a visualization, wherein the visualization data stream progresses according to the hierarchical structure to increase a level of detail of the visualization with respect to time.

20. One or more computer-readable storage media comprising computer-executable instructions executable to instruct a computing system to:
 access volumetric data from a data store, wherein the volumetric data correspond to a region;
 generate structured shape information for the region using at least a portion of the volumetric data, wherein the structured shape information is generated utilizing both a hierarchical structure of the volumetric data and a streamable shape specification comprising one or more types of shapes, wherein the one or more types of shapes are associated with a model of a portion of Earth; and
in response to a command from a client device, transmit to the client device, via a network interface, a visualization data stream generated using at least a portion of the structured shape information for rendering of a visualization, wherein the visualization data stream progresses according to the hierarchical structure to increase a level of detail of the visualization with respect to time.

* * * * *